(12) United States Patent
Loteanu

(10) Patent No.: US 10,853,219 B2
(45) Date of Patent: Dec. 1, 2020

(54) REAL-TIME INPUT/OUTPUT BANDWIDTH ESTIMATION

(71) Applicant: Intel Corporation, Santa Clara, CA (US)

(72) Inventor: Adrian Loteanu, Cupertino, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/399,064

(22) Filed: Apr. 30, 2019

(65) Prior Publication Data

US 2019/0258561 A1   Aug. 22, 2019

(51) Int. Cl.
| | | |
|---|---|---|
| *G06F 11/34* | (2006.01) | |
| *G06F 13/42* | (2006.01) | |
| *G06F 16/901* | (2019.01) | |
| *G06F 11/30* | (2006.01) | |

(52) U.S. Cl.
CPC ...... *G06F 11/3419* (2013.01); *G06F 11/3027* (2013.01); *G06F 11/3414* (2013.01); *G06F 13/4234* (2013.01); *G06F 16/9024* (2019.01)

(58) Field of Classification Search
CPC ............. G06F 11/3419; G06F 13/4234; G06F 16/9024; G06F 11/3414; G06F 11/3027
See application file for complete search history.

(56) References Cited

U.S. PATENT DOCUMENTS

| | | | | |
|---|---|---|---|---|
| 10,019,360 | B2* | 7/2018 | Wang | G06F 12/126 |
| 2007/0260415 | A1* | 11/2007 | Aguilar, Jr. | G06F 8/45 |
| | | | | 702/117 |
| 2009/0150582 | A1* | 6/2009 | Diefenbaugh | G06F 13/385 |
| | | | | 710/100 |
| 2009/0222124 | A1* | 9/2009 | Latwesen | G05B 23/0235 |
| | | | | 700/110 |
| 2011/0314225 | A1* | 12/2011 | Nishihara | G06F 9/5088 |
| | | | | 711/119 |
| 2012/0216015 | A1* | 8/2012 | Mitra | G06F 9/445 |
| | | | | 712/28 |
| 2018/0024963 | A1* | 1/2018 | Dreps | G06F 13/22 |
| 2018/0210531 | A1* | 7/2018 | Shahneous Bari | G06F 1/324 |
| 2018/0225144 | A1* | 8/2018 | Dinan | G06F 9/5016 |

* cited by examiner

*Primary Examiner* — Henry Tsai
*Assistant Examiner* — Christopher A Daley

(57) ABSTRACT

A bandwidth estimation method is disclosed for measuring memory bandwidth consumption or the bandwidth consumption of any I/O bus in real time on a computer system without the use of hardware counters. The bandwidth estimation method, designed to run in isolation on a core in a multi-core computer system, generates temporally sequential and spatially random accesses to a bus such as the memory bus and reports the average latency per request. Using a pre-calculated latency-bandwidth relationship, the bandwidth on the bus is calculated and reported at runtime for every latency sample. The bandwidth estimation method allows profiling processors and computer systems in real time to determine the amount of memory or I/O traffic they are using while running a workload.

20 Claims, 17 Drawing Sheets

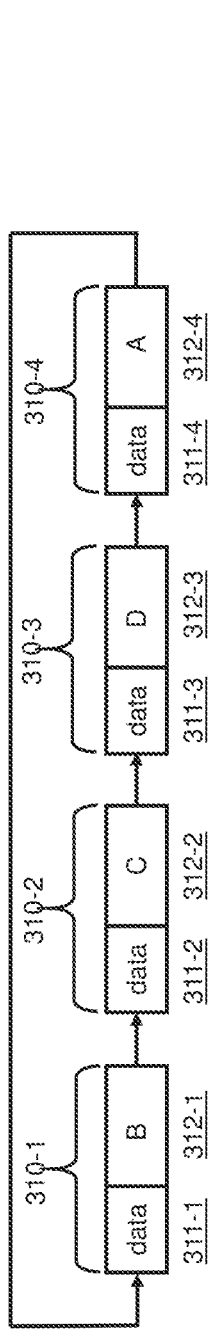
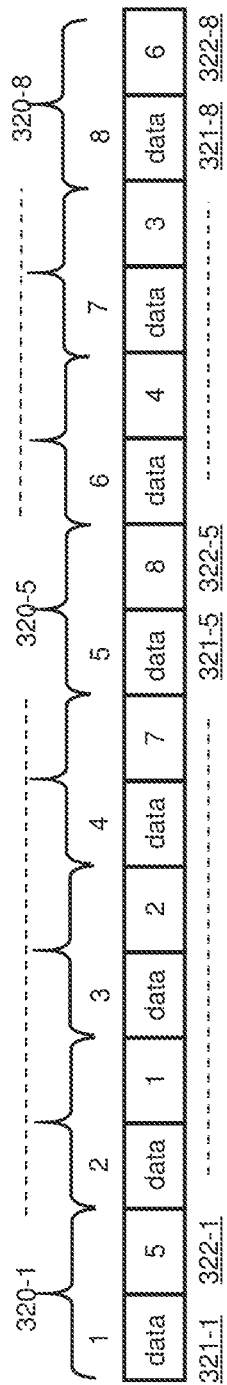
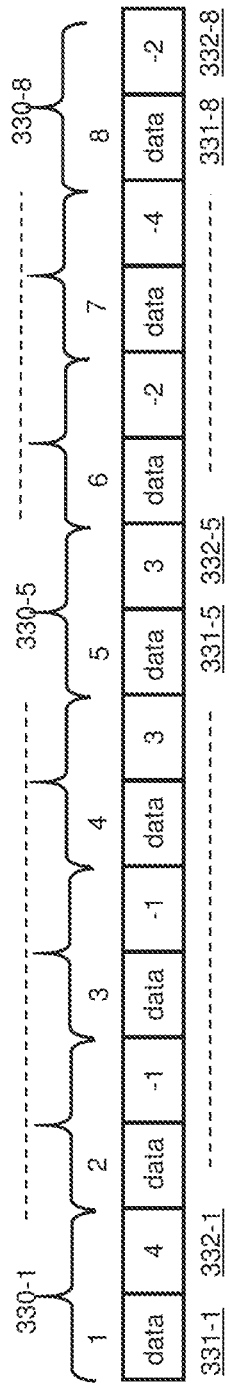

Figure 7

```
Num_elements = 300000000 // number of elements in list.
Size_of_element = 8 // bytes
Struct element {
Int data
Element* next
}

List_current = NULL
List_first = NULL
for (i = 1 to Num_elements) do
    allocate memory for new_element
        if List_start == NULL
            List_start = new_element
        endif
        if List_current != NULL
            List_current -> next = new_element
        endif
        List_current = new_element
    done
List_current -> next = List_start // end the cycle
```

```
Position1 = List_start
Position2 = List_start
for (i=1 to Num_elements/2) do
        Position2 = Position2->next
    done
for (i=1 to 100*Num_elements) do
    with 50% probability swap elements pointed to by Position1 and Position2 in list
    increment1 = generate random number between 0->1000
    increment1 = generate random number between 0->1000
    for (j =0 to increment1 )
            Position1 = Position1->next
        done
    for (j =0 to increment2 )
            Position2 = Position2->next
        done
```

```
Position = List_start
Iterations = 0
Threshold = 1000000000
// iterate continuously
Start_time = Record_time()
while ( true ) do // (block 504)

Position = Position-> next
    Iterations = Iterations + 1
    If (iterations = threshold) // (block 506)
        End_time = Record_time()
        Elapsed = End_time – Start_time
        Average_latency_per_access = Elapsed / threshold
            Call Procedure Report_bandwidth(Average_latency_per_access)
        Start_time = Record_time() // restart sampling
        endif
done Procedure Report_bandwidth(Average_latency_per_access)
    Return Pre_Calculated_Bandwidth_(Average_latency_per_access)
```

900

1100

REAL-TIME INPUT/OUTPUT BANDWIDTH ESTIMATION

BACKGROUND

In some computer systems, memory bandwidth may be measured by hardware counters, which physically monitor a bus of the computer system. Often however, these counters are not publicly available or even provided in the hardware. For example, many Advanced Micro Devices (AMD) processors do not offer such hardware counters. As another example, in some software environments, such as virtualized cloud environments, the hardware counters may be inaccessible to the virtualized computer system. Additionally, hardware counters are often platform-specific, which may require detailed knowledge of a platform's technical documentation to access.

Thus, a software developer running an application on a system without such hardware supported counters may be unable to measure how much bandwidth the application consumes. Similarly, applications running in environments lacking access to such hardware counters, such as many cloud environments, are unable to make these measurements.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

FIGS. 3A, 3B, and 3C are diagrams of example linked lists that may be used by the system of FIG. 1 or the method of FIG. 2.

FIG. 7 is a possible pseudocode implementation for generating the linked list to be used by the bandwidth estimation method of FIG. 2.

FIG. 8 is a possible pseudocode implementation to achieve randomly shuffled linked list elements, to be used by the bandwidth estimation method of FIG. 2.

FIG. 9 is a possible pseudocode implementation of operations of FIG. 6.

DETAILED DESCRIPTION

The present disclosure provides a computing system arranged to measure bandwidth (e.g., I/O bandwidth, memory bandwidth, etc.) where processing circuitry of the computing system does not have (or applications executing on the computing system do not have access to) bandwidth hardware counters. Also disclosed is a method to estimate bandwidth consumption (e.g., in real-time) of a computer system without the use of bandwidth hardware counters. With some examples, the computing system can include a multi-core processor. Instructions, executable by the multi-core processor can be arranged to estimate bandwidth (e.g., I/O bandwidth, memory bandwidth, etc.). The instructions can be executed in isolation on a core of the multi-core processor to generates temporally sequential and spatially random accesses to a bus coupled to the multi-core processor, such as, a memory bus, and to report the average latency per request. Subsequently, bandwidth on the bus is calculated and reported (e.g., at runtime) for every latency sample using a pre-calculated latency-bandwidth relationship. Accordingly, profiling processors and computer systems, even in real-time, to determine memory or I/O traffic while running a workload are provided.

In the following detailed description, reference is made to the accompanying drawings, which show by way of illustration specific embodiments in which the subject matter described herein may be practiced. However, it is to be understood that other embodiments will become apparent to those of ordinary skill in the art upon reading this disclosure. In other instances, well-known structures, materials, or operations are not shown or described in detail to avoid obscuring aspects of the disclosure. The following detailed description is, therefore, not to be construed in a limiting sense, as the scope of the subject matter is defined by the claims.

Figure 1:
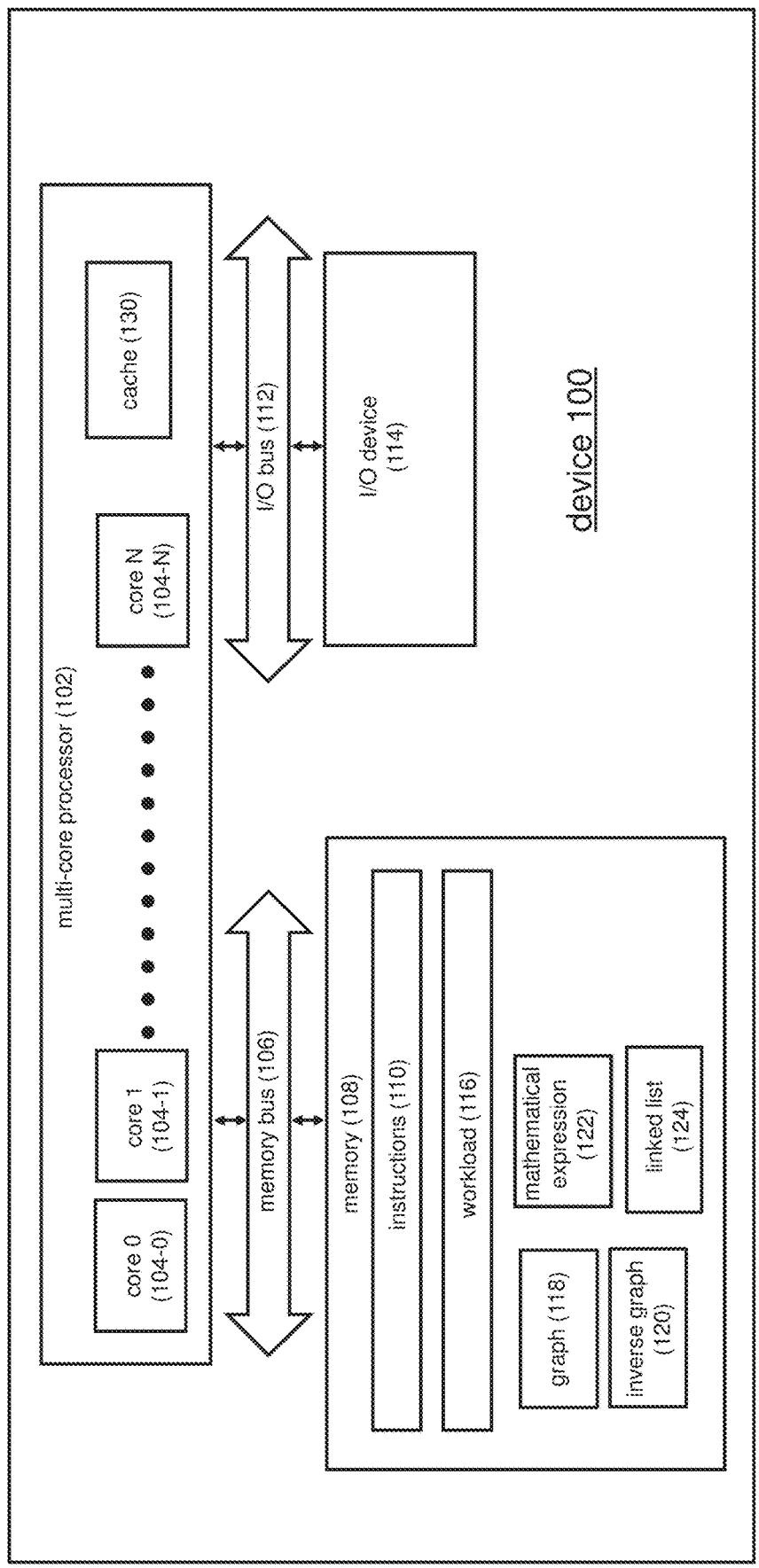
FIG. 1 is a block diagram of a system for estimating I/O bandwidth.
Figure 2:
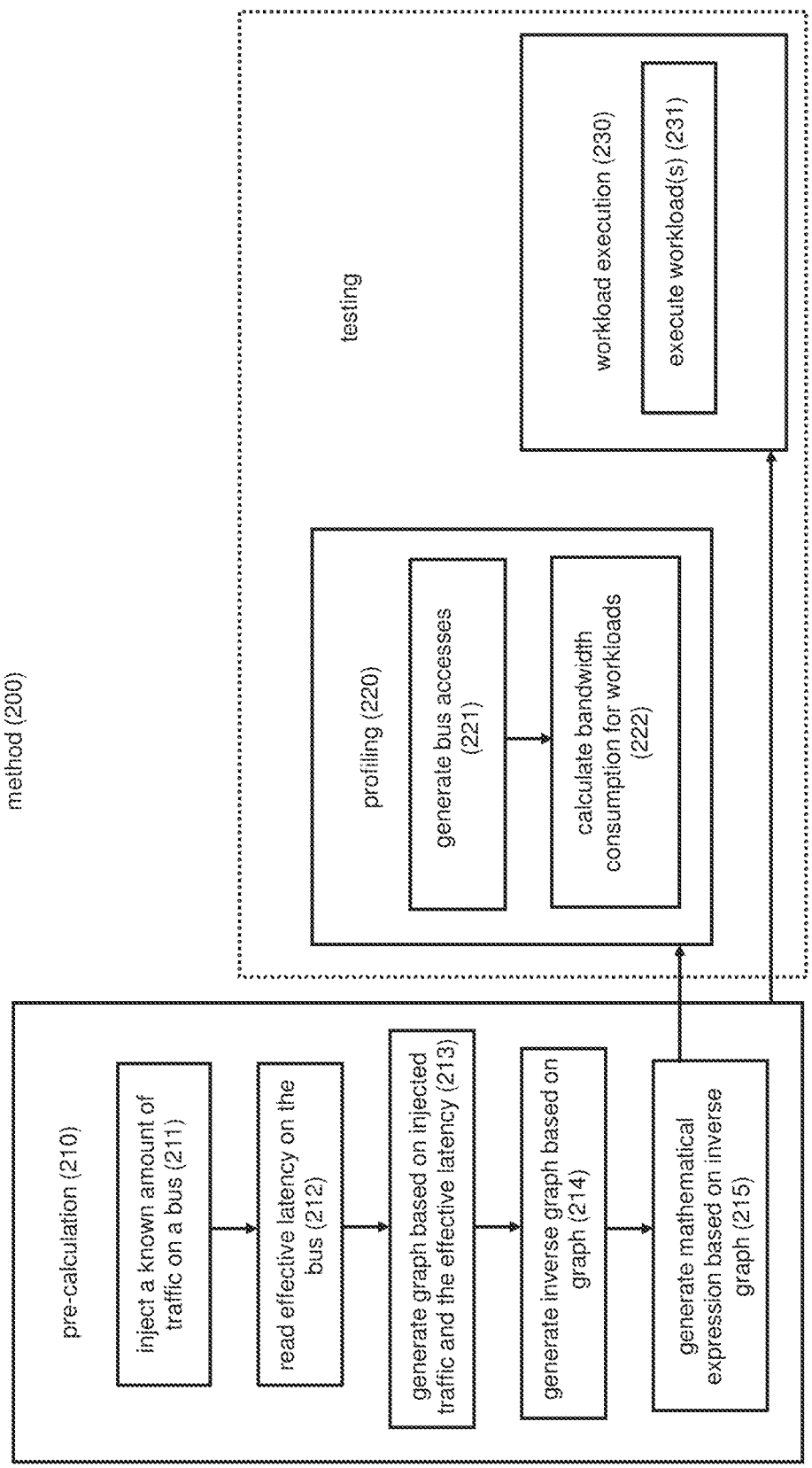
FIG. 2 is a schematic block diagram of a method for estimating I/O bandwidth.

FIGS. 1 and 2 are diagrams of a device 100 and a method 200, respectively, for estimating the bandwidth (e.g., memory bandwidth, I/O bandwidth, or the like) consumed by a system. The disclosure often uses the term bandwidth, which can be any of a variety of types of bandwidth, or "traffic" on a bus of a computer system. For example, bandwidth can be input/output (I/O) bandwidth, memory bandwidth, network bandwidth, or the like. Additionally, although FIGS. 1 and 2, and particularly device 100 and method 200, are described in conjunction with each other, device 100 may be implemented and arranged to measure, or estimate, bandwidth using a different method than that described in FIG. 2 while the method 200 could be implemented by a device different than that described in FIG. 1. The description is not limited in this respect. Also, as the device 100 is arranged to measure bandwidth (e.g., via implementation of method 200), device 100 may be referred to herein as a system under test (SUT).

In FIG. 1, the device 100 is a computing system consisting of a multi-core processor 102, a memory bus 106, and a memory 108, in which the multi-core processor 102 (or processor 102) is coupled to the memory 108 via the bus 106. The multi-core processor 102 consists of cores 0-N 104 (collectively "cores 104" or, individually, "core 104-0", "core 104-1", "core 104-N", etc,). Memory 108 stores instructions 110 and workload 112, which are executable by processor 102. In general, processor 102 can execute instructions 110 to estimate the bandwidth consumed on (or by) the device 100. More specifically, processor 102 can execute instructions 110 to estimate bandwidth associated with execution of workload 116. As a specific example, processor 102 can execute instructions 110 to estimate memory bandwidth of bus 106 associated with execution of workload 116.

Multi-core processor 102 can also include cache 130. The configuration of cache 130 can vary considerably, based on the particular multi-core processor 102. For example, each core 104 may have its own cache 130 or cache 130 may be a part of the multi-core processor 102, but implemented outside the cores 104 (e.g., as depicted). Furthermore, multi-core processor 102 may include multiple types (or levels) of cache, such as L1, L2, and so on.

Device 100 may also include an I/O bus 112 coupled to an I/O device 114. I/O device 114 may be internal or external to an enclosure in which device 100 is provided. Processor 102 may execute instructions 110 to estimate I/O bandwidth associated with I/O bus 114. Although examples are often described with reference to bandwidth estimation for memory bus 106, examples are not limited in this context. Memory 108 further includes a graph 118, an inverse graph 120, all of which are described in greater detail below.

An example operation of device 100, to estimate bandwidth consumption, is described with reference to method 200 of FIG. 2. In general, method 200 may be implemented to estimate the bandwidth consumed by a system. As noted, method 200 may be implemented to measure bandwidth consumed by a system without the use of hardware support, such as, bandwidth counters. Method 200 may include a number of sub-methods, such as pre-calculation sub-method 210, profiling sub-method 220, and workload execution sub-method 230. In general, sub-method 210 may be implemented to determine a relationship between latency and bandwidth for the SUT; sub-method 220 may be implemented to make temporally sequential and spatially random accesses to a bus to measure bandwidth consumed by workloads executed in sub-method 230. With some examples, multiple-cores of a multi-core processor may be utilized to execute instructions corresponding to sub-method 210, while a single core of the multi-core processor may be utilized to execute instructions corresponding to sub-method 220, and the other cores of the multi-core processor may execute workloads for sub-method 230.

As noted, in the following description, illustrations and examples often describe memory accesses. However, it is to be understood that the description could often equally be applied to accesses by way of another bus, such as an I/O bus, or the like. In other words, the present disclosure may be applied to measure bandwidth consumption (or bandwidth congestion) on any of a variety of buses, such as a PCI Express bus, a UPI bus, or the like. The illustrations and examples referencing memory accesses are not meant to be limiting.

Method 200 may begin at block 211 within pre-calculation sub-method 210. At block 211, "inject a known amount of traffic onto a bus", processor 102 may execute instructions 110 to inject a known amount of traffic onto a bus (e.g., memory bus 106, I/O bus 112, or the like). The bus with which traffic is injected may be a bus to be tested (or estimated for bandwidth consumption). Continuing to block 212, "read effective latency on the bus", processor 102 may execute instructions 110 to read the effective latency on the bus (e.g., memory bus 106, I/O bus 112, or the like) resulting from injecting traffic at block 211.

Figure 4A:
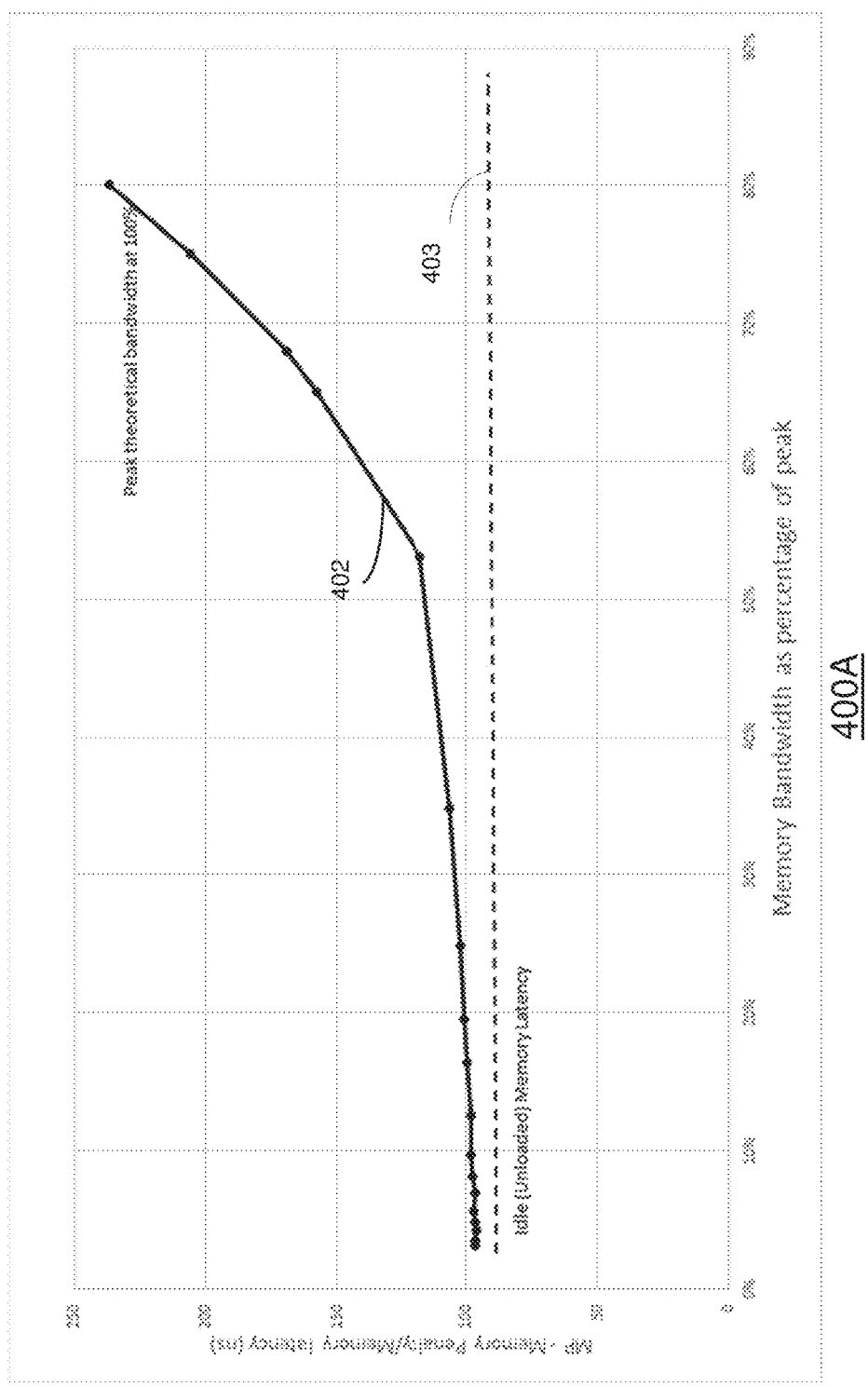
FIG. 4A is a graph of memory bandwidth versus memory latency of a multi-core system.
Figure 4B:
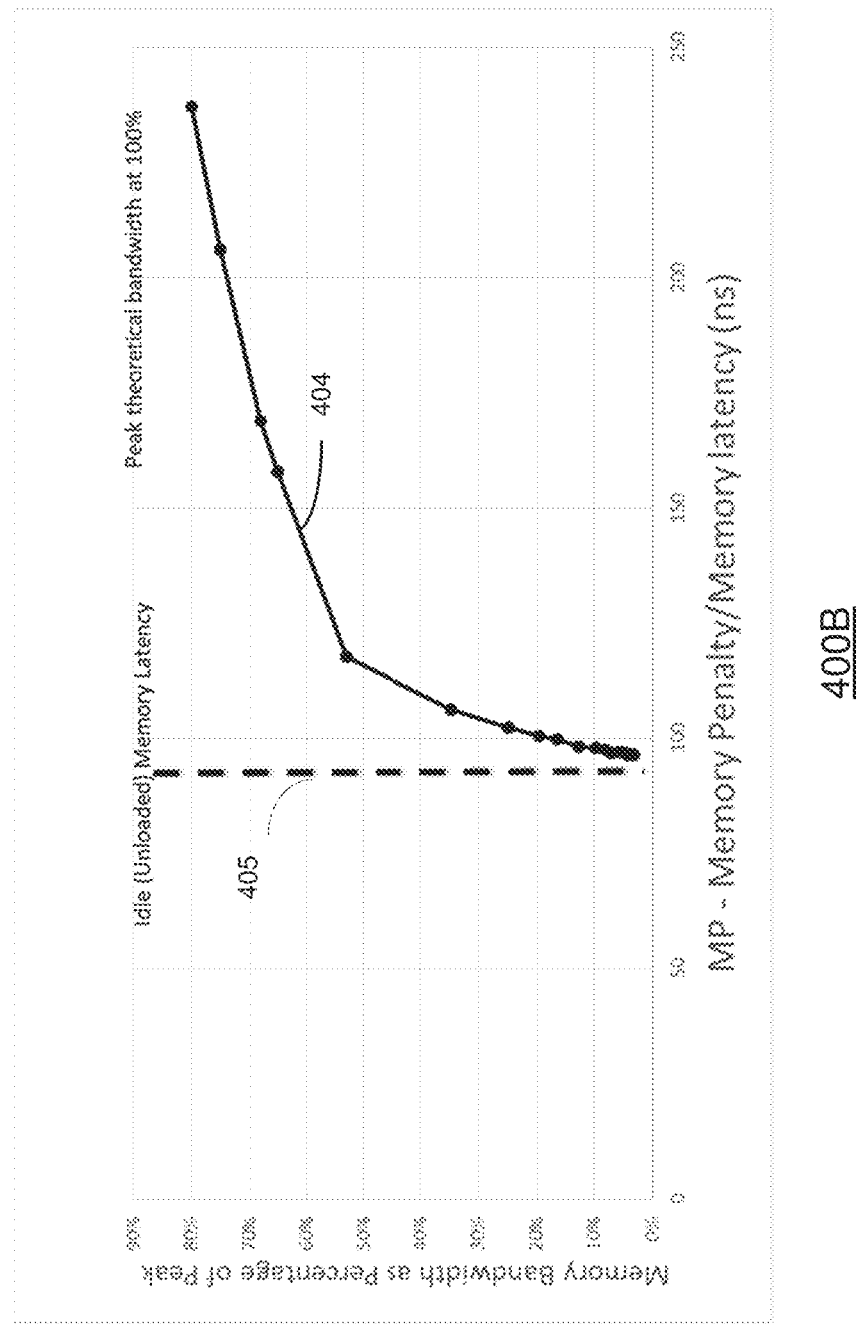
FIG. 4B is a graph of the memory latency versus bandwidth of the multi-core system of FIG. 4A.

Continuing to block 213, "generate graph based on injected traffic and the effective latency", processor 102 may execute instructions 110 to generate graph 118 based on the injected traffic (e.g., traffic injected at block 211) and the effective latency (e.g., effective latency read at block 212). In some embodiments, the graph 118 is of a memory bandwidth versus latency curve for the SUT (an example of which is illustrated in FIG. 4A and described below). The inverse graph 120 is an inverse of the graph 118 (an example of which is illustrated in FIG. 4B and described below). It is noted that the curves represented by graph 118 and inverse graph 120 may be different for different types or configurations of the SUT. For example, the curves may be dependent upon the processor of the SUT, the bus being instrumented, or a combination of both. In some examples, the curve calculated for one SUT may be able to be used on another SUT that has similar, but not identical, profiles.

Continuing to block 214, "generate inverse graph from the graph", processor 102 may execute instructions 110 to generate inverse graph 120 from graph 118. Continuing to block 215, "generate mathematical expression from inverse graph", processor 102 may execute instructions 110 to generate mathematical expression 122 from inverse graph 120.

With some examples, the mathematical expression 122 derived from the graph 120 may be a simple expression for bandwidth as a function of latency, denoted bandwidth (latency). The mathematical expression 122 may be used to derive the amount of traffic on the bus, as described in more detail below. With some examples, all cores 104 of processor 102 may be implemented to execute instructions 110 for sub-method 210 (e.g., blocks 211, 212, 213, 214, and 215).

Method 200 may continue from sub-method 210 to both sub-method 220 and sub-method 230. At block 231 of sub-method 230, "execute workloads", processor 102 may execute workload 116. In general, execution of workloads 116 by processor 102 will result in bus traffic (e.g., traffic on memory bus 106, traffic on I/O bus 112, or the like).

Sub-methods 220 and 230 of method 200 may be simultaneously implemented, for example, to determine bandwidth consumption for traffic resulting from execution of workloads 116 at block 231. That is, while sub-method 230 is active, method 200 may also continue from sub-method 210 to block 221 within sub-method 220. At block 221 "generate bus accesses," processor 102 may execute instructions 110 to make temporally sequential accesses to the bus (e.g., bus 106, bus 112, etc.). This means a first memory access is made, and once the access is complete, a second memory access is made to completion, immediately after the first memory access, and so on. In other words, two memory accesses are not made simultaneously, nor are the accesses overlapping, but the memory accesses succeed one another without much delay.

With some examples, processor 102, in executing instructions 110 may generate bus accesses based on linked list 124 to ensure this temporal sequentiality. In one embodiment, the linked list 124 is a large circular linked list that has been randomly arranged in memory in order to generate memory accesses that are sequential in time and that have minimum delay between them. In other embodiments, the linked list 124 is an array of absolute or relative indexes representing the next element to be visited in the traversal. With some examples, processor 102, in executing instructions 110, determines an appropriate size for the linked list 124.

Continuing to block 222, "calculate bandwidth consumption for workloads", processor 102 may execute instructions 110 to calculate bandwidth consumption for workloads 116 (e.g., executed by processor 102 at block 231) based on the mathematical expression 122 and the bus accesses made at block 221.

In some examples, processor 102 executes instructions 110 to make spatially random bus accesses at block 221. This means that, generally, non-contiguous locations of memory are accessed. This ensures that, with some exceptions, the accesses are not cached and, instead, actual memory is accessed. With some examples, turning off the cache 130 during execution of instructions 110 is avoided, and genuine memory accesses are made.

With some examples, a single core 104 of multi-core processor 102 may be utilized to execute instructions 110 at blocks 221 and 222 (e.g., sub-method 220) while the other cores 104 may be utilized to execute workload(s) 116. For example, core 104-0 may be utilized to execute instructions 110 for blocks 221 and 222 while cores 104-1 to 104-N are utilized to execute workloads 116 for block 231.

As noted, method 200 may be executed by a device having different configuration than device 100. For example, method 200 may be implemented by a computing device deployed in a virtualized environment, such as in a cloud computing environment, to calculate a system's bandwidth (e.g., memory, I/O, etc.), even if hardware performance counters are not exposed to the virtual machine.

Although a relationship between latency and bandwidth of the SUT is pre-calculated as described herein (e.g., sub-method 210), method 200 is otherwise independent of the actual architecture of the SUT (e.g., device 100) upon which it runs. Thus, method 200 may be adapted to be used on other devices, buses, and/or architectures to monitor bandwidth congestion.

In some embodiments, the bandwidth estimation method 200 is run on one core of a multi-core computer system in isolation of any other application, whether on the core on which the bandwidth estimation method is running or on any other cores of the multi-core system. This ensures that the measured latency is not affected by scheduling. This isolation may be achieved with existing tools to enforce process affinity (for example, taskset in Linux). Latency per memory access may be calculated without the need for precise hardware timers by doing a known large number of requests and dividing the total wall clock time elapsed, as measured by any standard clock, by the number of requests. The wall clock time may be read with any time reporting function present in programming languages, such as clock( ) in the C programming language.

The present disclosure refers to the relationship between latency and bandwidth and also discusses injecting traffic onto a bus. Thus, examples of injecting a known amount of traffic deserves further explanation. In general, injecting traffic onto a bus means that a series of memory requests, to consume a known amount of bandwidth, are generated. For example, during a one-second period, a 1 MB packet or "chunk" of data may be sent to memory 108 via memory bus 106. Latency resulting from this traffic injection, e.g., corresponding to traffic of 1 MB/second, may be recorded.

An analogy is useful for explaining what happens. Suppose you had two cities, the "processor" city and the "memory" city, and these two cities are connected by a highway (the memory bus). Cars on the highway are like memory requests. The buildings in the "processor" city are like the cores. When the highway is being used, it is analogous to the system having applications running.

First, assurances are made that nobody is using the highway (no applications running). Then, from all the buildings (cores) in the "processor" city, a known number of cars (memory requests) during every unit of time go to the "memory" city and come back. Since the number of cars is known, the bandwidth is also known. If 1000 cars are sent every minute from the "processor" city to the "memory" city, that's 1000 cars/minute. This is kept up until cars start returning from the "memory" city to the "processor" city, such that the round trip for each car may be measured. The latency (round-trip time) associated with the bandwidth of 1000 cars/minute is thus determined. The more cars per minute, the higher the latency; the fewer cars per minute, the lower the latency, with an empty highway corresponding to "idle" latency or round-trip time.

Block 211 of method 200 is analogous to sending a known number of cars per unit time. Thus, 1000 cars departing the "processor" city every minute is like "injecting" them onto the highway in a controlled manner. Thus, processor 102, in executing instructions 110, may send, from all cores 104, a known amount of memory requests per unit time to memory 108 via memory bus 106. In the analogy, all buildings (cores) would send a total known number of cars, which may then be scaled and the latency measured. So, at first, one car per minute would be sent and the round-trip time measured, then ten cars per minute would be sent and the round-trip time measured, and so on, until the shared highway (memory bus) is fully congested. What results is the latency vs bandwidth curve (FIG. 4A), which is the round-trip time corresponding to a known number of cars per minute.

At block 221 of the method 200, temporally sequential and spatially random bus accesses occur. To continue the analogy, all cores but one (all buildings in the "processor" city) go about their normal business and run whatever application or set of applications for which the bandwidth consumption is to be measured. One building (a single core) sends out one car (memory access) to the "memory" city at a time and waits for the car to return to the "processor" city before sending another car out (memory access). Measuring how long the car takes to do a round-trip time over the highway and using the round-trip time vs bandwidth curve provides an estimation of how congested the highway is (how many cars per minute are traversing the highway). This illustrates what is happening to the shared memory bus. The core (building) running the application sends one car at a time and, once the car returns, as soon as possible, a new car is sent (temporally sequential). Accordingly, processor 102 may execute instructions 110, on a single core 104 such that the bus accesses may not be interrupted. Returning to the analogy, the one "profiling" building can tell how much the rest of the city is congesting the common shared highway (memory bus).

To further the analogy, the cache 130 of FIG. 1 may be like a warehouse next to the "processor" city, where the warehouse stores a small part of what is in the "memory" city. If the address in the "memory" city the car is going to happens to have a copy in the warehouse, then the cars will just go to the warehouse instead of the "memory" city, thus resulting in no highway (memory bus) access and a shorter round-trip time. Thus, with some examples, method 200 includes blocks to determine a size of cache 130 and to determine an optimal size of the linked list 124, which is used to generate the bus access at block 221. Returning to the analogy, cars are sent to addresses covering a range larger than the local cache "warehouse" that are requested at random, so as to minimize this possibility (spatially random accesses). The cache can be a per-core cache (like a storage unit in the building available only to residents) or a larger shared cache (like a warehouse used by the entire city).

FIGS. 3A, 3B, and 3C are simplified diagrams illustrating linked lists, which can be examples of linked list 124. FIG. 3A illustrates linked list 302, which is a circular linked list. The linked list 302 may include a number of indexes 310. Each index 310 includes an indication of data as well as the next address location (e.g., next location for bus access). For example, index 310-1, corresponding to address A, includes indication of data 311-1 and address 312-1 (e.g., address B). Index 310-2, corresponding to address B, includes indication of data 311-2 and address 312-2 (e.g., address C). Index 310-3, corresponding to address C, includes indication of data 311-3 and address 312-3 (e.g., address D). Index 310-4, corresponding to address D, includes indication of data 311-4 and address 312-4 (e.g., address A). The content of each index 310 in the linked list 302 thus provides data for the bus access as well as a pointer to the next address in the list. Linked list 302 is circular in nature because the final index 310-4 points to the address of the first index 310-1.

FIG. 3B illustrates linked list 304, which is an array of absolute indexes. That is, linked list 304 includes indexes 320 comprising indications of data 321 and an absolute address location 322. For example, index 320-1 includes indications of data 321-1 as well as an absolute address location 322-1, which points to address for index 320-5 in this example. Index 320-5 includes indications of data 321-5 as well as an absolute address location 322-5, which points to address for index 320-8 in this example, which index itself includes an indication of data 321-8 and address 322-8. As can be seen, each index 320 includes an indication of the next location (or index 320) to traverse. Accordingly, traversal based on the linked list 304 would result in locations 1, 5, 8, 6, 4, 7, 3, 2, returning to 1.

FIG. 3C illustrates linked list 306, which is an array of relative indexes. That is, linked list 306 includes indexes 330 comprising indications of data 331 and a relative index 332. For example, index 330-1 includes indications of data 331-1 as well as a relative address location 332-1, which points to the address for index 330-5 in this example (e.g., current index 330-1+4. Index 330-5 includes indications of data 331-5 as well as a relative address location 332-5, which points to address for index 330-8 in this example (e.g., current index 330-5+3), which index itself includes an indication of data 331-8 and address 332-8. As can be seen, each index 330 includes an indication of the next location (or index 330) to traverse. Accordingly, traversal based on the linked list 306 would result in locations 1, 5, 8, 6, 4, 7, 3, 2, returning to 1.

It is noted that, when traversing linked list 124 (e.g., by processor 102 executing instructions 110 at block 221, or the like), the address of the next access to memory may not be known until the current access has been resolved (e.g., read by the processor core 104, or the like). Once the current element of the linked list is read, the delay until an actual bus access request is made for the next element may be minimal. In some embodiments, by ordering the linked list 124 randomly and by making the linked list 124 significantly larger than the caches of the SUT (e.g., cache 130 of SUT 100), most requests will be resolved within the effective latency. In some embodiments, processor 102, in executing instructions 110, may profile the SUT to determine a size of its cache (e.g., cache 130) and calculate an appropriate size for the linked list 124 based on the determined cache size. In some examples, an appropriate size for the linked list 124 is ten times or more the size of the cache 130.

FIG. 4A is a graph 400A of memory bandwidth versus memory request latency for a computer system (e.g., computing system 100, or the like). Graph 400A depicts curve 402 representing memory bandwidth (x axis) versus memory latency (y axis). Curve 402 was generated based in part on a computing system comprising an Intel Xeon 8180M multi-core processor. In general, curve 402 may be determined (e.g., generated, plotted, calculated, derived, or the like) based in part on processor 102, executing instructions 110, to inject traffic onto a bus and reading the latency resulting from the traffic injection. Graph 400A further includes a baseline 403, which represents the memory latency when there is almost no traffic on the bus. It is noted that curve 402 can be sensitive to the mixture of bus traffic (e.g., read/write ratio). However, for most real workloads, curve 402 has been observed to not vary too significantly, allowing at least a rough estimate of the memory traffic.

With some examples, processor 102 can execute instructions 110 to determine curve 402 prior to executing instructions corresponding to sub-methods 220 and 230. That is, given graph 400 including curve 402, processor 102 can execute instructions 110 to profile bandwidth consumption for a wide variety of software applications. Thus, using a pre-generated latency versus bandwidth curve for a given system, each measurement of latency allows for the calculation of the approximate memory bandwidth utilized during a sampling period.

The curve 402 may be calculated for a given system using various existing tools by injecting a known amount of memory traffic and reading the effective latency on the memory bus. Thus, by using one core to profile the system in the way described, the memory bandwidth activity of all the other cores of the SUT can be monitored, even when no hardware counters are available for measuring this value.

FIG. 4B is a graph 400B of memory latency versus bandwidth for a computer system (e.g., computer system 100, or the like). Graph 400B depicts curve 404 representing memory latency (x axis) versus memory bandwidth (y axis). Curve 404 may be described as the inverse of curve 402, which may have been generated by a computer system comprising an Intel Xeon 8180M multi-core processor. As noted, graph 400B is an inverse of the graph 400A. The processor 102 may execute instructions 110 to interpolate the curve 404 of graph 400B, resulting in mathematical expression 122. With some examples, mathematical expression 122 may be a polynomial.

Figure 5A:
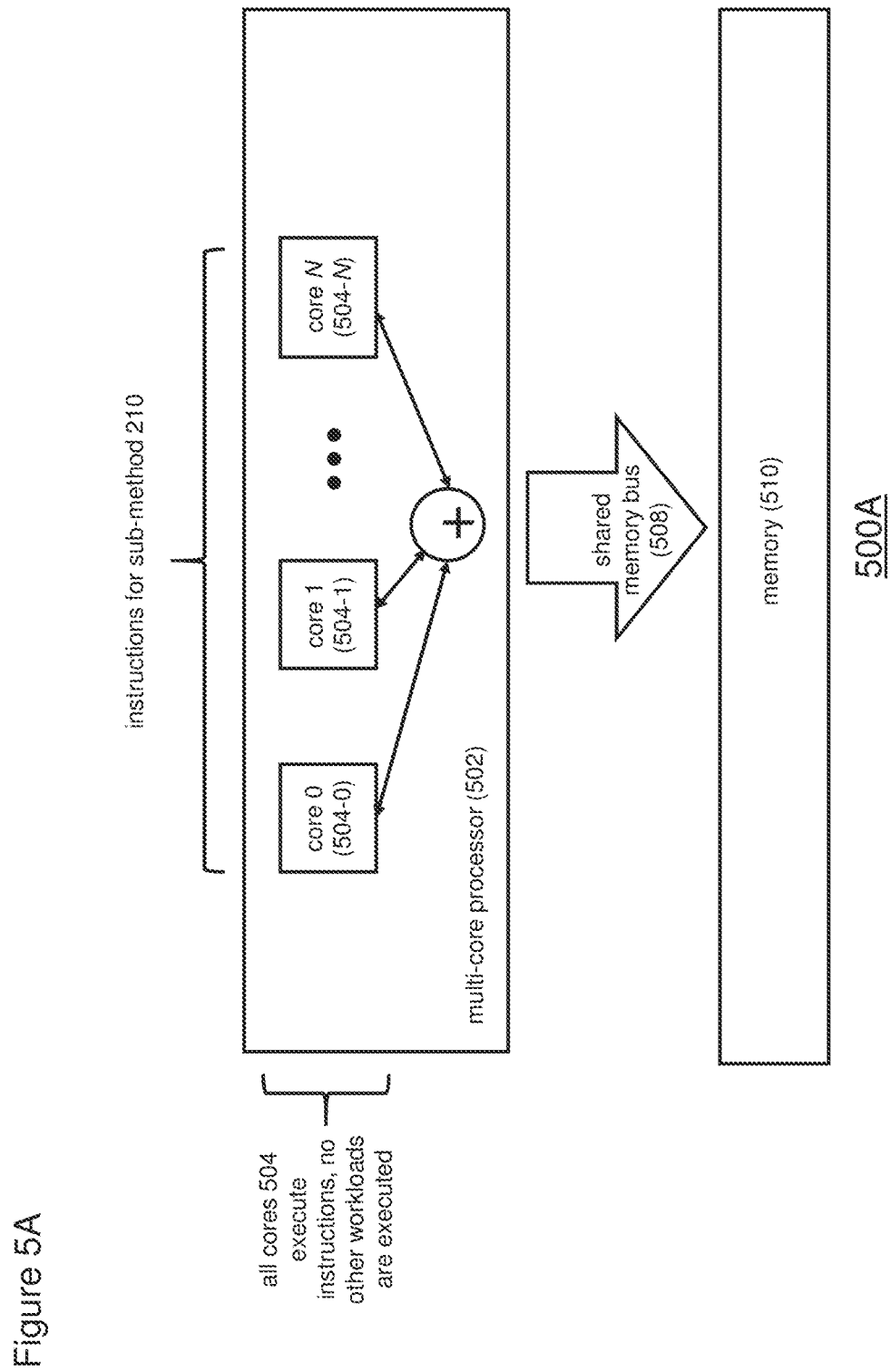
FIGS. 5A and 5B are representations of a multi-core processor running the bandwidth estimation method of FIG. 2.
Figure 5B:
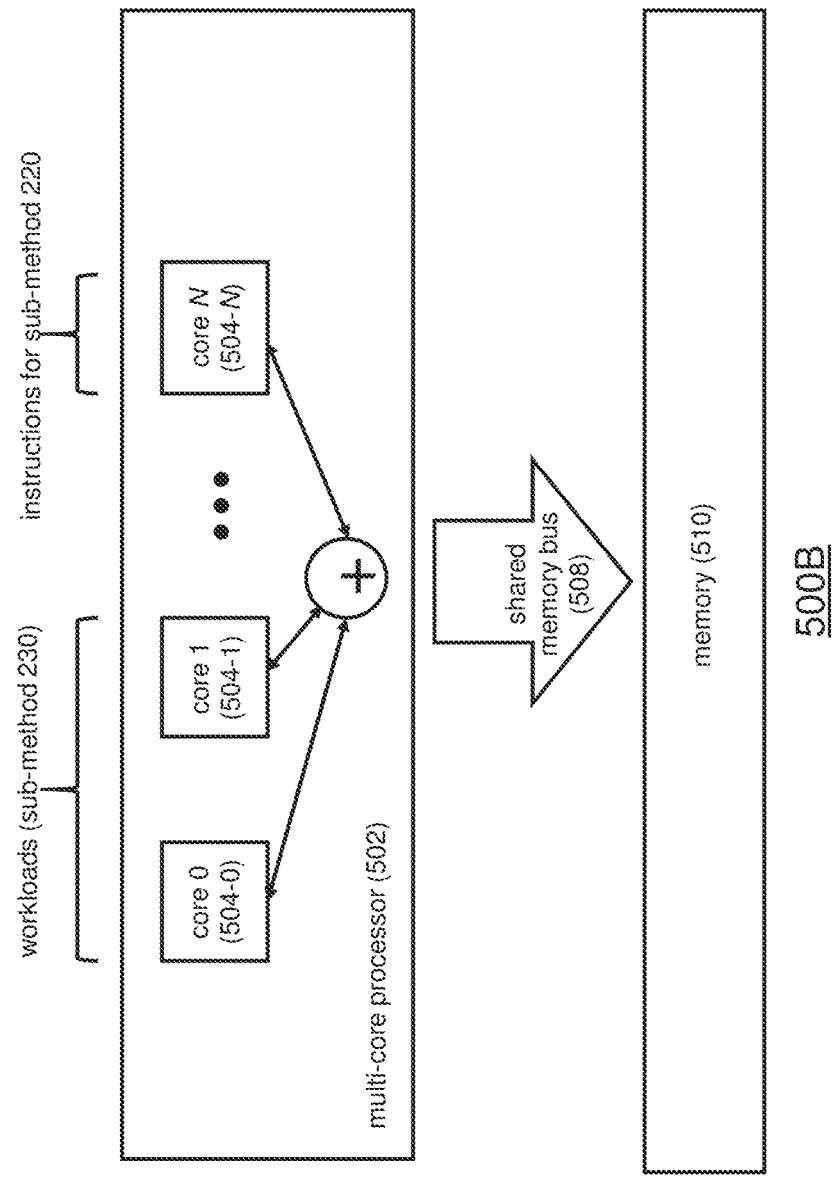

FIGS. 5A and 5B are representations 500A and 500B, respectively, of a system 500 including a multi-core processor 502 coupled to memory 510 via a shared memory bus 508. These figures particularly represent multi-core processor executing instructions and workloads to implement method 200. Representation 500A depicts operations of multi-core processor 502 for sub-method 210 of method 200 while representation 500B depicts operations of multi-core processor 502 for sub-methods 220 and 230 of method 200.

It is noted that accesses to memory 510 occur through shared memory bus 508. As illustrated in FIG. 5A, multi-core processor 502 may execute instructions corresponding to sub-method 510 on all N cores 504 of an otherwise unloaded SUT. In other words, no other applications are running (or being executed by cores 504). As described above, processor 502 may execute instructions to determine the relationship between latency and bandwidth for memory 510 via bus 508.

Turning to FIG. 5B, multi-core processor 502 may execute instructions corresponding to sub-methods 220 and 230. For example, a single core (e.g., core 504-N) of processor 502 may execute instructions for sub-method 220 to generate temporally sequential and spatially random accesses to memory 510 via bus 508, as described above. In addition, other cores 504 execute other workloads (e.g., workloads 116, or the like) or combination of workloads, which themselves may generate an arbitrary amount of traffic via bus 508. In other words, the other cores 504 (e.g., 504-1, 504-2, etc.) operate as normal.

Traffic from these other cores 504 (e.g., cores 504-0 to 504-(N−1)) may interfere with the known traffic pattern from core 504-N, adding congestion delay, as described by the curve 402 (FIG. 4A). Accordingly, processor 502, and particularly, core 504-N, may execute instructions to measure the extra delay and derive an amount of traffic on the bus 508 using the relationship given by the curve 404 (FIG. 4B) and from which the mathematical expression 122, as described herein.

Thus, in some embodiments, real-time monitoring and measuring of consumed memory bandwidth, while workloads are running on a system and consuming a significant amount of bandwidth, can be measured and/or determined. Thus, insight into the amount of bandwidth consumed by various workloads may be obtained.

Figure 6:
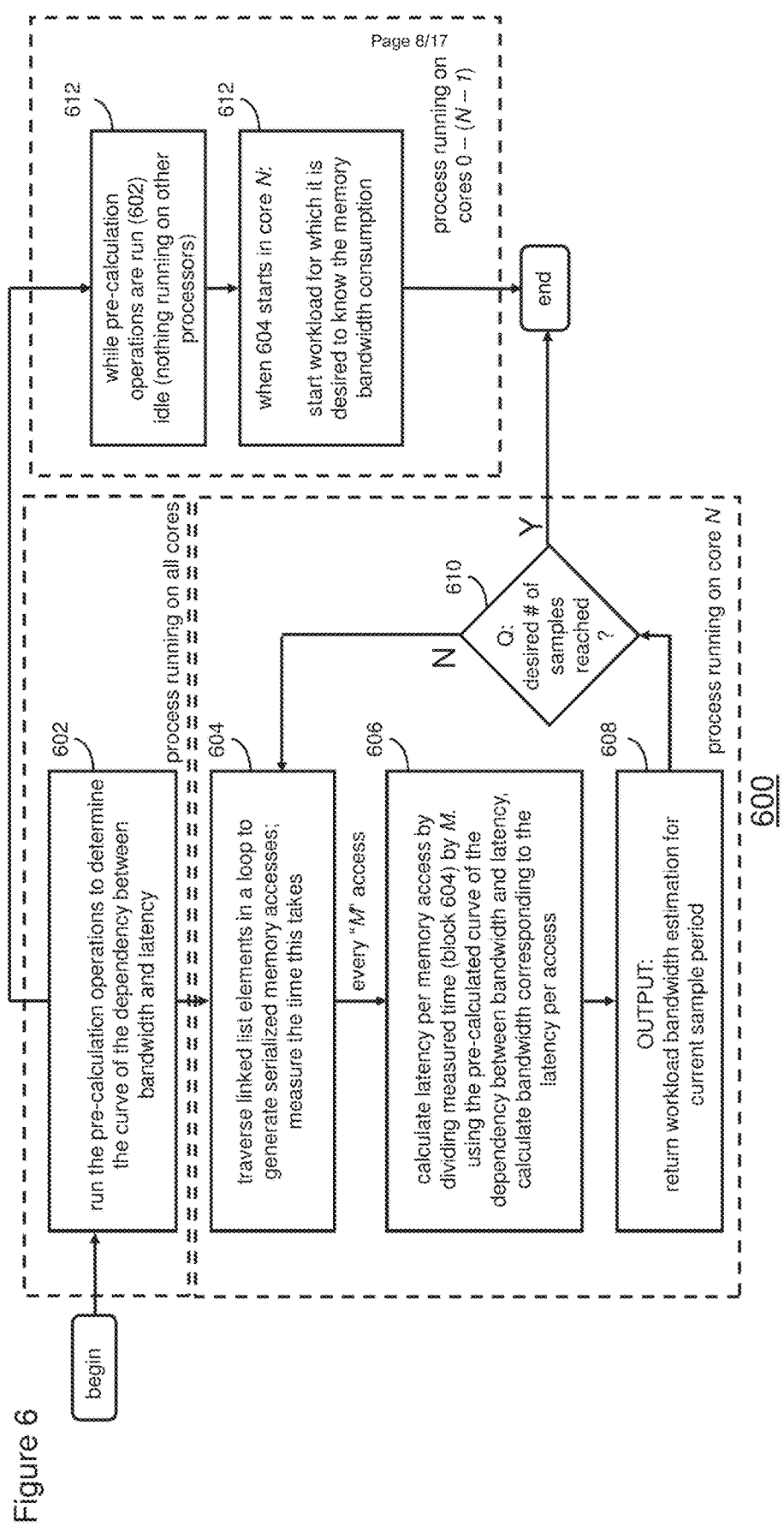
FIG. 6 is a flowchart illustrating operations performed by the bandwidth estimation method of FIG. 2 on a multi-core SUT.

FIG. 6 is a flowchart 600 illustrating operations, which may be implemented by a system as described herein. The flow diagram 600 is divided into three parts: instructions corresponding to the first part (602) may be executed by all cores of a multi-core processor (e.g., SUT) while instructions corresponding to the second part (604-610) may be executed by a single core (e.g., core N) and instructions corresponding to the third part (612 and 614) may be executed by the remaining cores (e.g., cores 0 to N−1) of the SUT. An example of this is given with respect to FIGS. 5A and 5B.

In some embodiments, the method 600 calculates the bandwidth/latency dependency curve (e.g., curve 402 in FIG. 4A) on all cores of the SUT when no other workload is running. Thus, while the initial operation (block 602) is running on all cores, no other workloads are active. At block 602, the curve of the dependency between bandwidth and latency may be generated, resulting in a curve (e.g., curve 402 (FIG. 4A). From curve 402, an inverse curve, such as the curve 404 (FIG. 4B), may be derived. Given the inverse curve 404, a mathematical expression may be determined. With some examples, computing systems may include memory profiling tools (e.g., Intel Memory Latency checker, or the like) that may be utilized to generate the inverse Latency(Bandwidth) curve (e.g., curve 404 in FIG. 4B). With some examples, processor 102 may execute instructions 110 to invert the axis and interpolate between the points to generate a function (e.g., mathematical expression 122) that, given a latency, will return the associated bandwidth.

Method 600 may continue from block 602 to blocks 604 and 612. At block 612, cores of a processor (e.g., cores 504-0 to 504-(N−1) of processor 502) may execute workloads 116. Furthermore, at blocks 604 through 610 a single core (e.g., core 504-N of processor 502) may execute instructions to traverse elements of a linked list (e.g., in a loop, or the like), to generate serialized memory accesses, while the time taken to traverse the loop may be measured. While all elements in the linked list may be traversed, in some embodiments, a predefined portion of the linked list elements is traversed, with the subsequent calculations being based on the number of elements traversed rather than the size of the linked list. In some embodiments, the operations of block 604, on core N, and block 614, on cores 1-(N−1), occur simultaneously. In other embodiments, the operations of block 604 commence once the operations of block 614 have begun.

The linked list is traversed continuously, in some embodiments. Each access to an element involves a memory read which first returns the data of that element in order to have the address of the next element in the list and be able to generate a new access. Memory accesses launched in this mode will not interfere with each other as they are guaranteed to be temporally serialized.

After traversing a set number of elements, "M", of the linked list, in some embodiments, the test 122 measures the wall clock time and divides elapsed time since the last sample by the number of traversed elements, "M". Put another way, every "M" accesses, the latency per memory access is calculated by dividing the measured time value (from block 604) by M. Using the pre-calculated curve of the dependency between bandwidth and latency (from block 602), the bandwidth corresponding to the latency per access is calculated (block 606). The pre-calculated mathematical function that, given a latency, will produce a bandwidth consumption number, that is, the derived mathematical expression (such as 122 in FIG. 1) is used for this calculation.

Thus, the result of the operation in block 606 should be the latency per memory request. In an unloaded system, that is, one in which no other applications are running, this will be equal to the idle latency of the bus. In a congested system, this latency will be higher and the value by which it grows depends on the bandwidth utilization done by the other cores in the system, which can be calculated and reported using the relationship derived from the curve 402 (FIG. 4A). The calculation can be done trivially by using the function that interpolates between the points of the measured Bandwidth (Latency) curve which has been generated in block 602 and is represented in FIG. 4A.

The result of the bandwidth estimation method 600, the workload bandwidth estimation for the current sample period, is returned (block 608). The result is based on the workload that is being performed in the 0-(N−1) cores (block 614). If the desired number of samples has not been reached (block 610), the operations may be repeated as many times as desired to get more bandwidth samples during a workload. Otherwise, the operations of the bandwidth estimation method are complete. In some embodiments, one innovation of the bandwidth estimation method 600 is the assembly of these operations to produce a bandwidth estimation from the latency measurement done every "M" memory accesses.

Thus, in some embodiments, the bandwidth estimation method 600 records and uses the latency information reported from the linked list traversal loop running isolated on a single core to generate an estimation of memory bandwidth utilization by using the latency-bandwidth curve such as the one in FIG. 4A.

In some embodiments, the test portion of the bandwidth estimation method 600 creates a large circular linked list, for example, one that is more than ten times the size of the cache of the processor, and this linked list is to reside in the memory 510 (FIGS. 5A and 5B). In some embodiments, each element of the linked list contains a pointer to the next element in the order of traversal.

The bandwidth estimation method 600 is able to test bandwidth utilization on busses besides the memory bus, in some embodiments. The non-memory bus may couple the processor to a different functional unit of the SUT. For example, a PCI bus may couple the processor to an external hard drive, where the hard drive is a functional unit. Or the PCI bus may couple the processor to a graphics card, making the graphics card the functional unit. As in the examples above, the pre-calculation program would be configured to run on the first core and would be executed while no workloads are running on the remaining cores, and would determine a relationship between latency and bandwidth for the SUT. Then, the test program would perform temporally sequential and spatially random accesses to the functional unit, whether it be the hard drive or the graphics card, and the test program would be run on one core while the workloads are run on the remaining cores. Finally, the bus bandwidth calculation program would calculate the bus bandwidth consumed during these operations.

One possible pseudocode implementation 700 for generating the linked list 124 as used herein, is provided in FIG. 7. In this example, 300,000,000 8-byte elements are defined (for a total of 2.4 GB). In some embodiments, the number of elements is determined by knowing the cache size of the SUT and setting the number to be at least ten times its size. However, the linked list is to be stored in the memory and thus the size of the available memory is also a consideration, in some embodiments. The size of the element, shown as 8-byte, could also be 4-byte for a 32-bit pointer and 4-byte for int value, although the embodiments described herein are not limited to these values, and may be larger than the examples given here.

In some embodiments, the size of the elements of the linked list is implementation-dependent. For example, the size can be any reasonable size (any variable type). In some embodiments, the size is at least the size of the pointer of the SUT, so, for example, on a 64-bit system, the size is at least 8 bytes if using a circular linked list, although, for an array with indexes, the size could be less. Another consideration is the cache line size, which is usually 64 bytes. In some embodiments, the size of the list elements is smaller than the cache line size.

In some embodiments, the elements in the linked list are randomly shuffled such that the linked list remains a single complete cycle. The random shuffling ensures that traversing the linked list generates as few cache hits as possible and the accesses go to system memory. Operating systems may allocate the memory from block 604 in consecutive memory regions that are cached, which is to be avoided if possible, since the bandwidth estimation method 600 is to generate non-cached memory accesses.

FIG. 8 provides a possible pseudocode implementation 800 to achieve randomly shuffled linked list elements. The pseudocode 800 results in a large circular linked list where, as much as possible, consecutive elements in the list are in non-consecutive regions of memory.

FIG. 9 provides a possible pseudocode implementation 900 for operations of blocks 604 and 606 of FIG. 6. The threshold given is an arbitrary sampling interval, in some embodiments. A smaller interval may be used to generate more accurate fine-grained samples, but is also more sensitive to noise in the time measurements. In some embodiments, the Pre_Calculated_Bandwidth_(Average_latency-per_access) is an interpolating polynomial of the form $a(n)^x + a(n-1)^{x(n-1)} + \ldots$, which is calculated from FIG. 4B.

The polynomial interpolates the measurement points in the curve 404 (FIG. 4B). In other embodiments, a function fitting the data $1/(ax+b)$ may be used. In other embodiments, an exponential function is used.

The result of this calculation is the estimated bandwidth consumed by all the other cores in the system which can be running any combination of workloads or applications. In some embodiments, the result is given in percentage of peak bandwidth, from which the value in GB/s can be derived. Knowing the bandwidth consumption is useful for software developers looking to find bottlenecks and optimize their code.

The operations of the bandwidth estimation techniques described herein may be embedded in profiling products, such as Intel VTune or the Linux "perf" tool, to report memory bandwidth on systems that do not support measuring memory bandwidth from hardware.

The bandwidth estimation techniques described herein may be used to measure memory bandwidth on a system without publicly available hardware counters, such as AMD's EPYC server, while running several benchmarks for which it is desired to know how much memory bandwidth the benchmarks consume.

Figure 10:
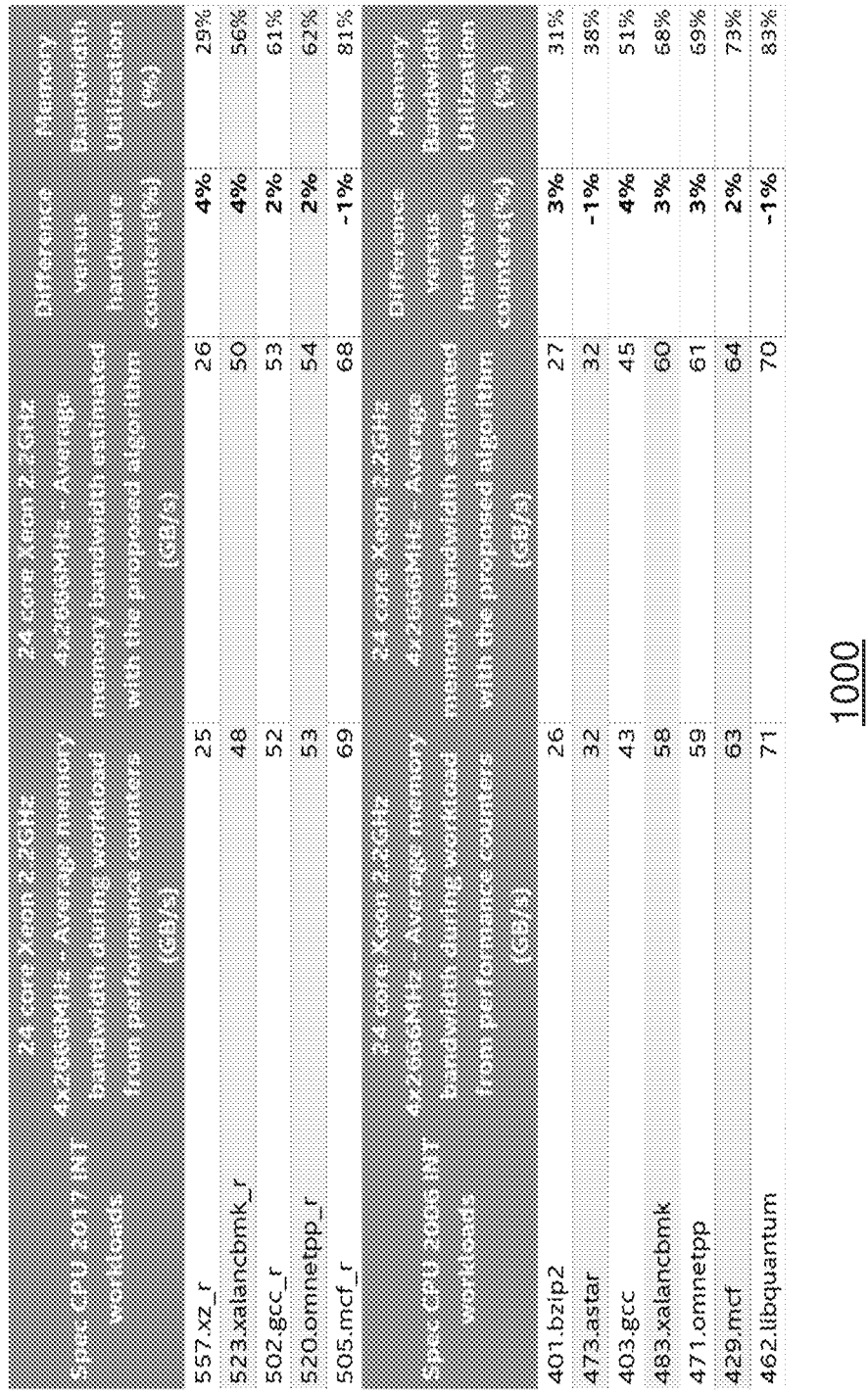
FIG. 10 is a table showing a comparison of memory bandwidth measurement on two high-bandwidth-consumption workloads between the bandwidth estimation method of FIG. 2 and performance counter reported values.

FIG. 10 is a table 1000 showing results of measuring memory bandwidth based on the present disclosure versus performance counter reported values on the same system for SpecINT2017 and SpecINT2006 workloads with high bandwidth consumption. Workloads are sorted in order of increasing bandwidth consumption. For example, the 557.xz_r workload consumes 29% of memory bandwidth while the 520.0mnetpp_r workload consumes 62% of memory bandwidth. The SUT comprises an Intel Xeon multi-core processor (e.g., a 24-core Xeon 2.2 GHz 4×2666 MHz processor). All workload examples shown in FIG. 10 consume at least 25% bandwidth.

Compared to bandwidth estimation testing with hardware counters, the bandwidth estimation according to the present disclosure performed well (e.g., within 5%). Thus, the present disclosure may be helpful for profiling bandwidth for workloads that use a significant amount of bandwidth, which are often interesting for bandwidth profiling studies. In some embodiments, the bandwidth estimation techniques described herein may be implemented as part of a profiling software program/product aimed at facilitating software developers identifying how much memory or I/O bandwidth their code is consuming, even if hardware counters for bandwidth are not available on that platform and bandwidth cannot otherwise be measured.

Figure 11:
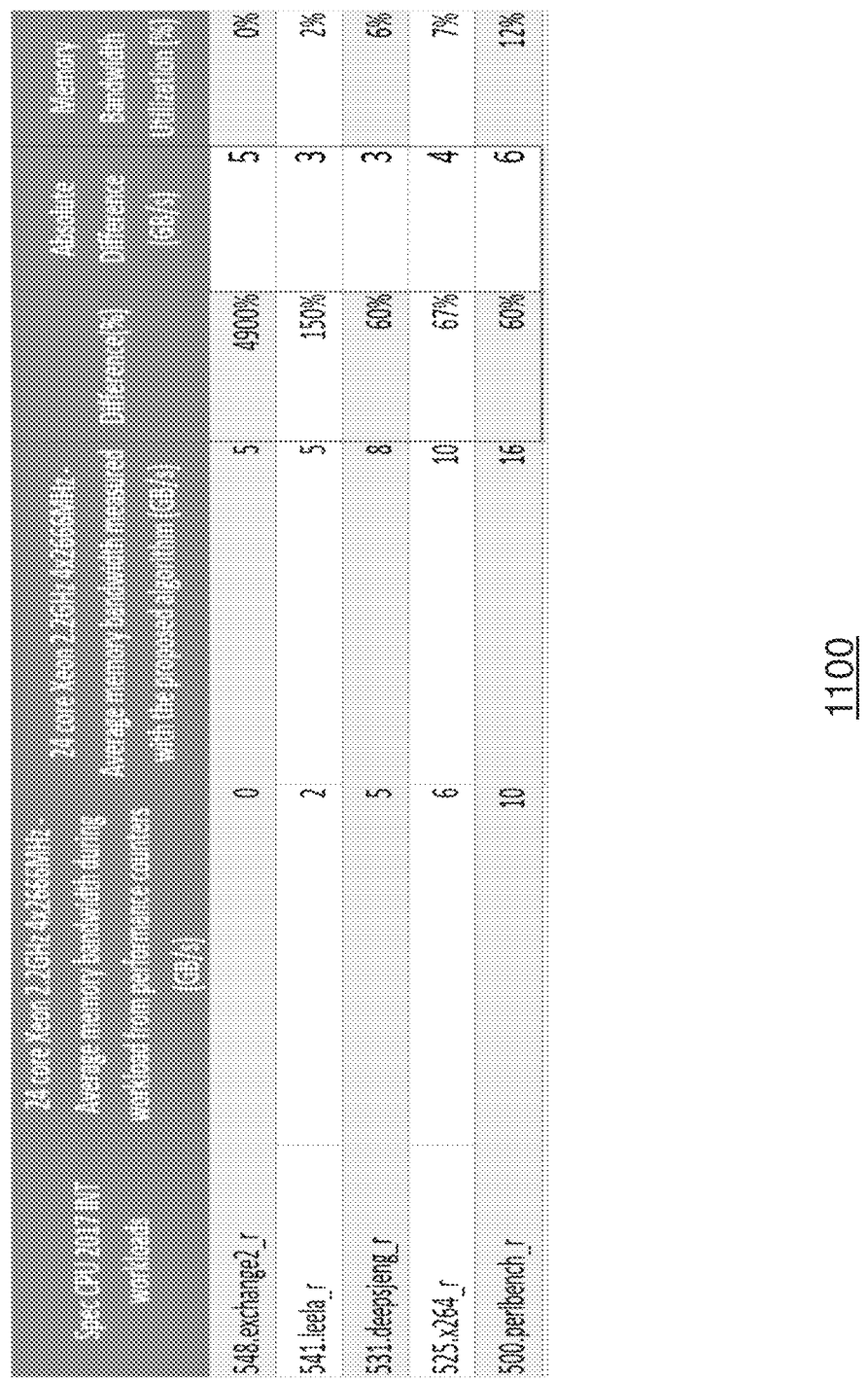
FIG. 11 is a table showing results of measuring memory bandwidth with the bandwidth estimation method of FIG. 2 versus performance counter reported values on the same system for low bandwidth consumption workloads.

FIG. 11 is a table 1100 showing results of measuring memory bandwidth based on the present disclosure versus performance counter reported values on the same system for SpecINT2017 components with low bandwidth consumption. Workloads are sorted in order of increasing bandwidth consumption.

At illustrated, workloads are accurately identified by the method to consume little bandwidth and the value is predicted within 0-6 GB/s based on data in the table. For a system having a total available bandwidth of 127 GB/s, this represents less than 5% of the total range in which the bandwidth can be (0-127). Usually there is no need of finding out exactly what the value is in these cases where bandwidth is not a limitation. Accordingly, the present disclosure provides for identifying low bandwidth categories that do not have bandwidth as a bottleneck.

Figure 12:
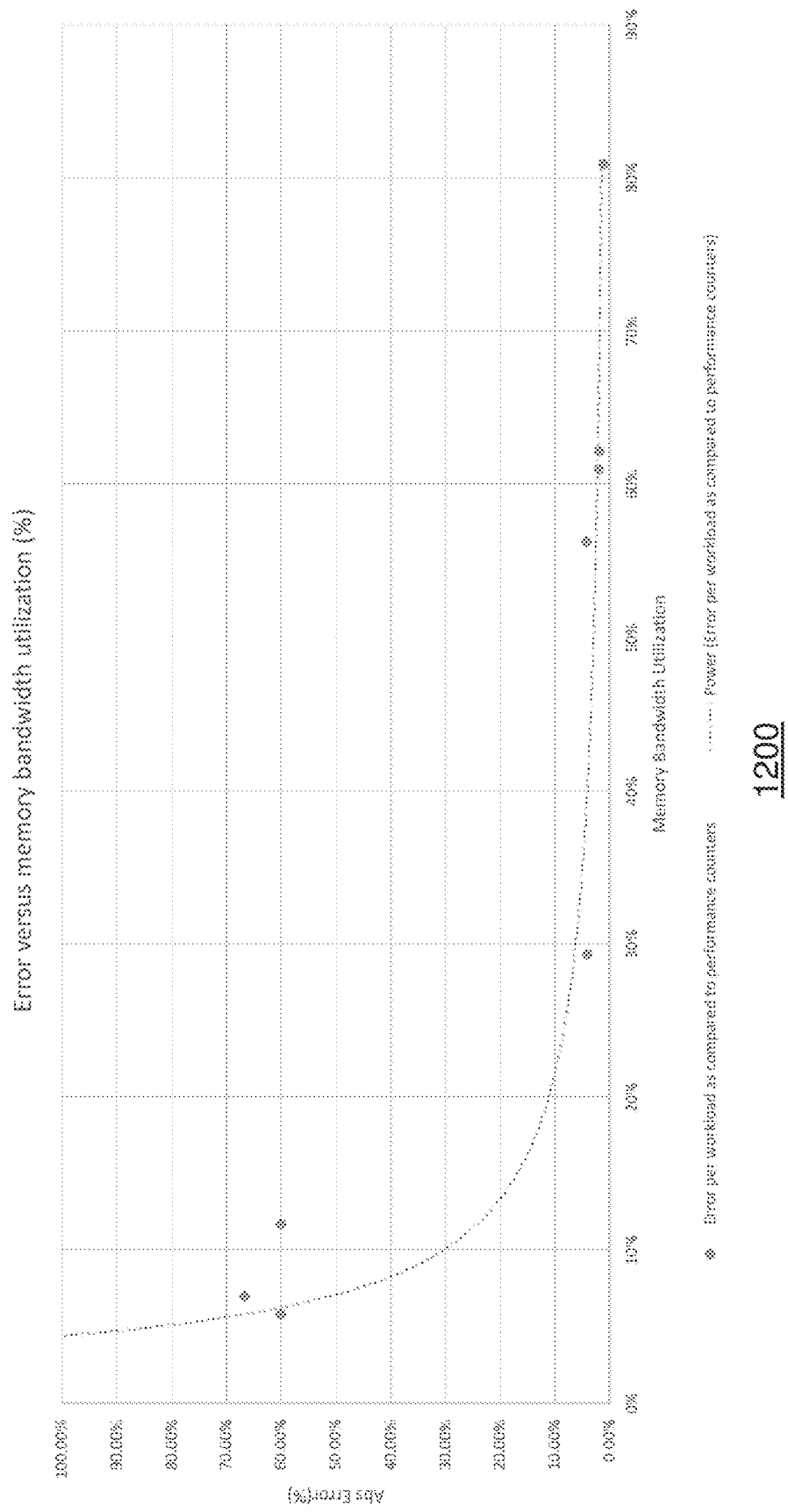
FIG. 12 is a graph illustrating the errors of the bandwidth estimation method of FIG. 2 when compared to performance counters plotted against the memory bandwidth for a given workload.

FIG. 12 is a graph 1200 illustrating the errors of the bandwidth estimation when compared to performance counters plotted against the memory bandwidth utilization percentage (bandwidth from performance counters/peak theoretical bandwidth) for SpecINT2017 components. Errors are low enough for practical purposes when bandwidth utilization is greater than 25.

Figure 13:
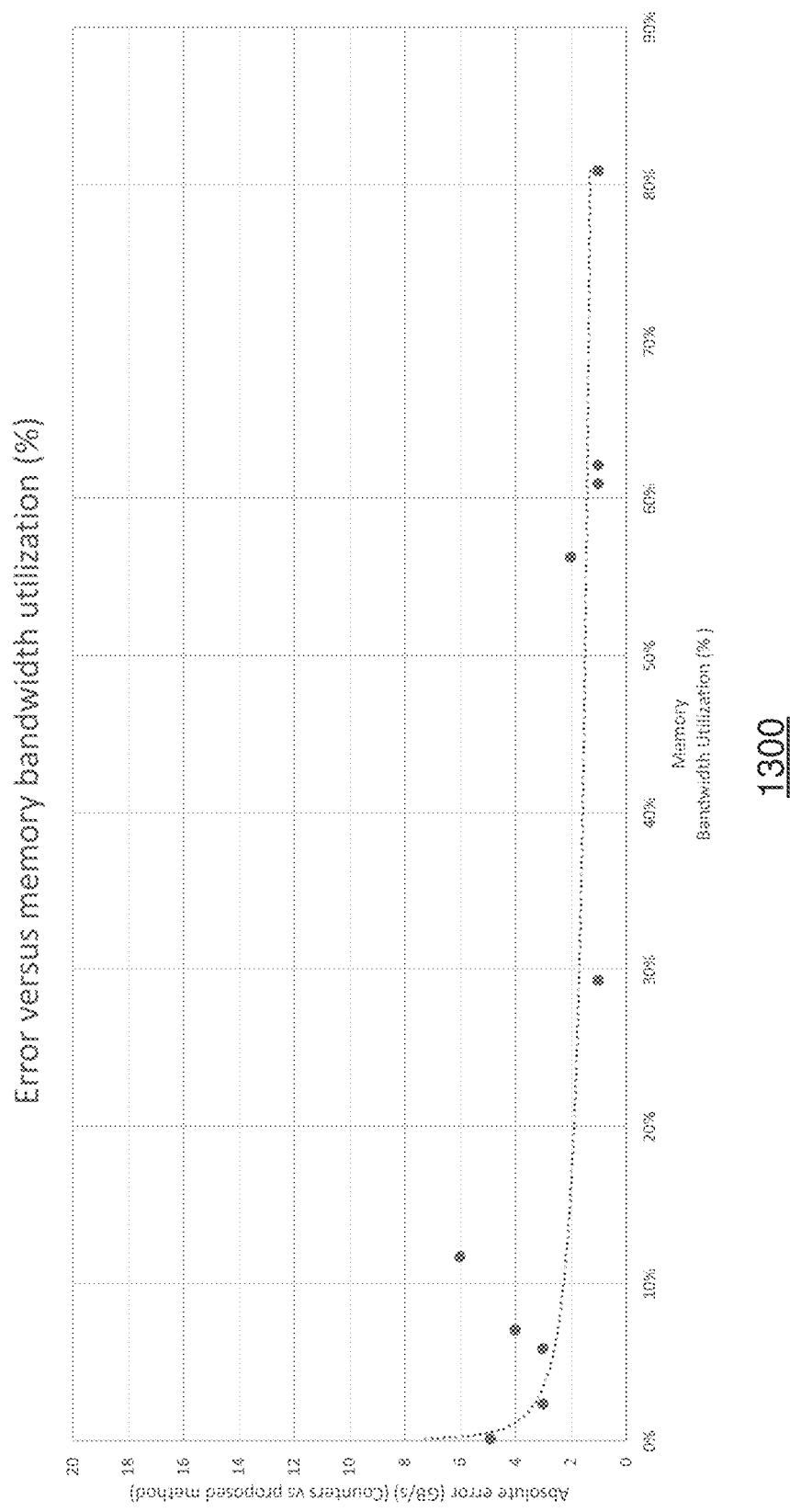
FIG. 13 is a graph illustrating the errors of the bandwidth estimation method of FIG. 2 when compared to performance counters plotted against the memory bandwidth utilization percentage for a given workload.

FIG. 13 is a graph 1300 illustrating the errors of the bandwidth estimation when compared to performance counters plotted against the memory bandwidth utilization percentage (bandwidth from performance counters/peak theoretical bandwidth) for SpecINT2017 components. The maximum error is 6 GB/s in the low bandwidth region and above 25% bandwidth utilization the error is less than 2 GB/s. Peak memory bandwidth on the system is 85 GB/s. The graphs 1200 and 1300 show that the error versus performance counters is high when bandwidth utilization is less than 25% of the peak theoretical value but the error is less than 5% for cases where bandwidth utilization is higher than 25%.

In some embodiments, the error may be higher as bandwidth utilization is lower. This may be due to the far left edge of the latency-bandwidth curve 402 (FIG. 4A), where the congestion latency is low and can be more significantly impacted by noise in the latency measurements, including noise from the traffic generated in measuring latency during workload execution (e.g., block 221 of method 200 in FIG. 2). With some embodiments, accuracy may be improved with an increase in sampling.

In other examples, the accuracy of latency measurements may be improved by using more accurate clocks, such as rtdsc on x86 or an equivalent on other architectures. In some embodiments, clock( ) from C/C++ for ease of portability to ARM may be used, although it may sacrifice some accuracy) and more fine-grained sampling of time. In some embodiments, sampling may occur every billion element traversals in the linked list. In some embodiments, setting the process priority to the highest setting in the operating system has also been observed to reduce the error. The latency-bandwidth curve 402 in FIG. 4A may be plotted with arbitrary resolution by increasing the number of samples, to further reduce the error. These methods may, in principle, reduce the error significantly, even in the case of low bandwidth utilization.

Figure 14:
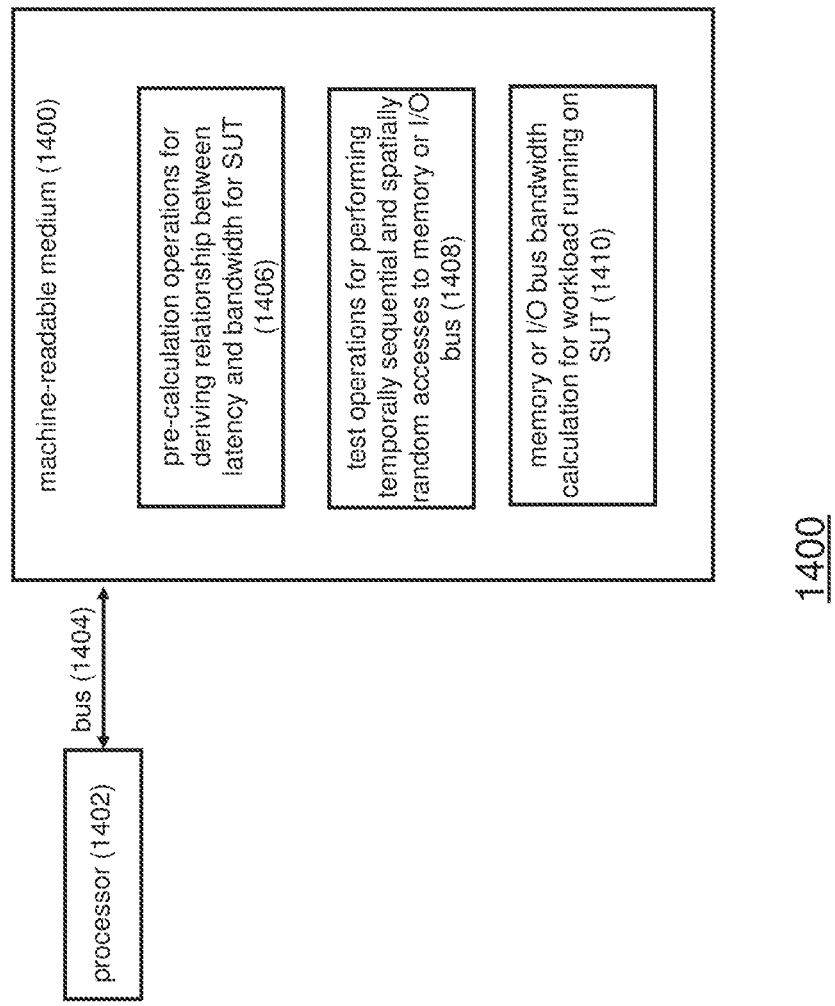
FIG. 14 is a simplified block diagram of a machine-readable medium including a processor capable of implementing operations performed by the bandwidth estimation method of FIG. 2.

FIG. 14 is a simplified block diagram of an exemplary non-transitory, machine readable medium 1400 including code or instructions to direct a processor 1402 to perform the operations of the bandwidth estimation method of FIG. 2, according to some embodiments. The processor 1402 may access the non-transitory, machine readable medium 1400 over a bus 1404. The non-transitory, machine readable medium 1400 may include code 1406 to direct the processor 1402 to pre-calculate a relationship between latency and bandwidth of a memory or I/O bus for the SUT. The non-transitory, machine readable medium 1400 may include code 1408 to direct the processor 1402 to perform temporally sequential and spatially random accesses to the memory or I/O bus of the SUT. The non-transitory, machine readable medium 1400 may include code 1410 to direct the processor 1402 to calculate the memory or I/O bus bandwidth for a workload running on the SUT.

Use Cases

In some embodiments, bandwidth estimation based on the present disclosure may be integrated into profiling products targeted at software developers. One example of a profiling product is known as VTune Amplifier, a product of Intel Corporation, and there are many others. These profiling products monitor and measure performance-related aspects of running code on a system. VTune can already measure memory bandwidth on many systems using hardware counters. However, on systems not having hardware counters, such as AMD systems, VTune does not report memory bandwidth consumption. Such bandwidth estimation techniques may be part of such profiling products as a fallback method for measuring memory bandwidth consumption on any hardware platform, even when hardware counters are not available.

In some embodiments, the bandwidth estimation based on the present disclosure may be integrated into operating systems (OSs) to offer system administrators an estimate of how much memory bandwidth software is consuming. Tools such as the "System Monitor" from Windows, which works on any platform, regardless of the architecture, may be able to use the bandwidth estimation techniques to measure consumed memory or I/O bandwidth, even if no hardware support for measuring memory bandwidth is offered. Thus, a real-time accurate profile of the bandwidth resources consumed by running applications may be provided.

In some embodiments, the bandwidth estimation based on the present disclosure may be platform/OS independent and can be integrated into OS performance monitoring tools such as the "Task manager" or "System monitor" on any platform to offer system administrators information about how much memory or IO bandwidth is being consumed by running applications, thus enabling the identification of performance bottlenecks.

Figure 15:
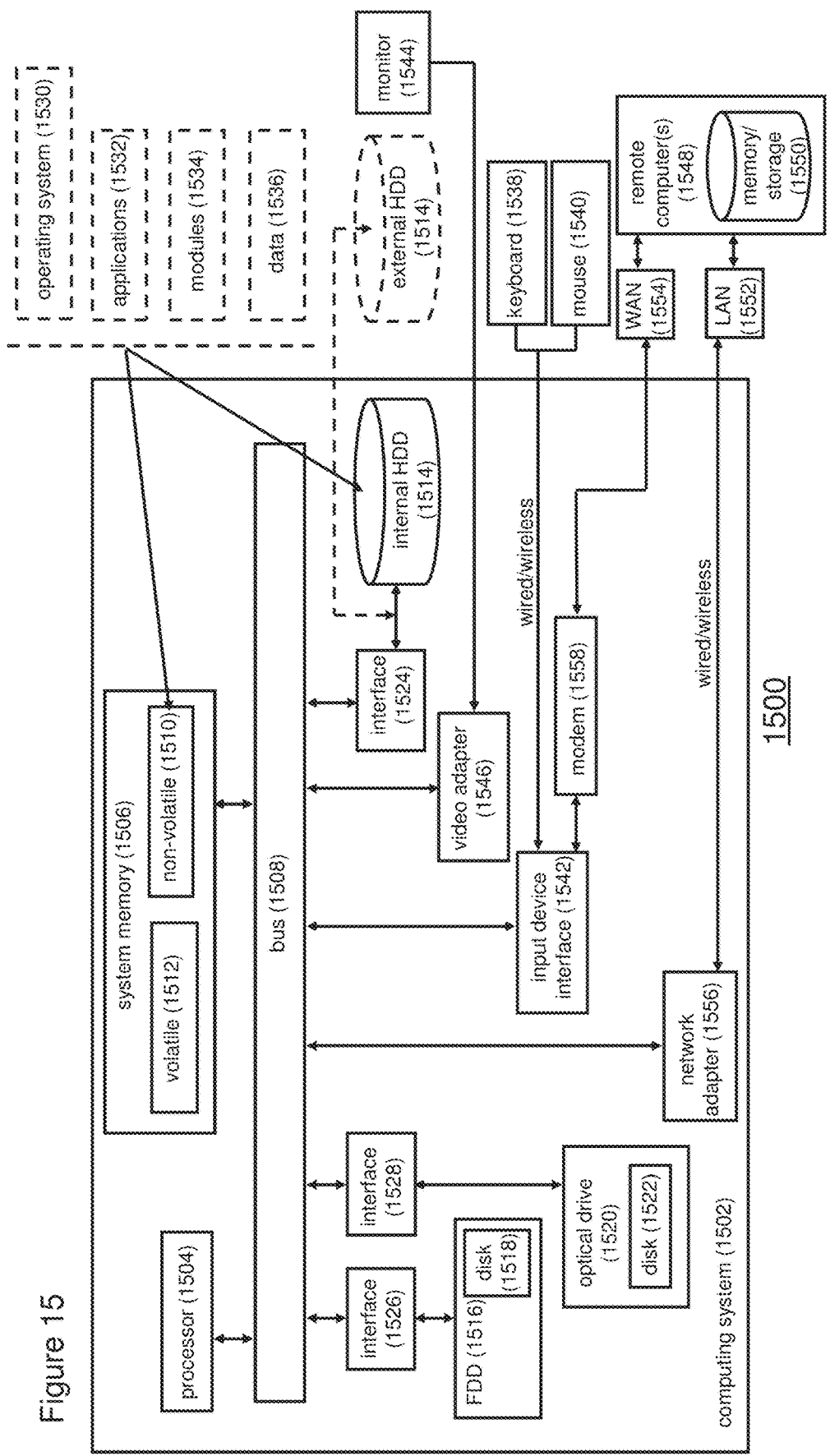
FIG. 15 is an illustration of an exemplary computing architecture comprising for implementing the bandwidth estimation method of FIG. 2.

FIG. 15 illustrates an embodiment of an exemplary computing architecture 1500 comprising a computing system 1502 that may be suitable for implementing various embodiments as previously described. In various embodiments, the computing architecture 1500 may comprise or be implemented as part of an electronic device. In some embodiments, the computing architecture 1500 may be representative, for example, of a system that implements one or more components of the bandwidth estimation system 100 and bandwidth estimation method 200. In some embodiments, computing system 1502 may be representative, for example, of the mobile devices used in implementing the bandwidth estimation method 200. The embodiments are not limited in this context. More generally, the computing architecture 1500 is configured to implement all logic, applications, systems, methods, apparatuses, and functionality described herein.

As used in this application, the terms "system" and "component" and "module" are intended to refer to a computer-related entity, either hardware, a combination of hardware and software, software, or software in execution, examples of which are provided by the exemplary computing architecture 1500. For example, a component can be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 1502 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 1502.

As shown in FIG. 15, the computing system 1502 comprises a processor 1504, a system memory 1506 and a system bus 1508. The processor 1504 can be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi-processor architectures may also be employed as the processor 1504.

The system bus 1508 provides an interface for system components including, but not limited to, the system memory 1506 to the processor 1504. The system bus 1508 can be any of several types of bus structure that may further interconnect to a memory bus (with or without a memory controller), a peripheral bus, and a local bus using any of a variety of commercially available bus architectures. Interface adapters may connect to the system bus 1508 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 1506 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 15, the system memory 1506 can include non-volatile memory 1510 and/or volatile memory 1512. A basic input/output system (BIOS) can be stored in the non-volatile memory 1510.

The computing system 1502 may include various types of computer-readable storage media in the form of one or more lower speed memory units, including an internal (or external) hard disk drive (HDD) 1514, a magnetic floppy disk drive (FDD) 1516 to read from or write to a removable magnetic disk 1518, and an optical disk drive 1520 to read from or write to a removable optical disk 1522 (e.g., a CD-ROM or DVD). The HDD 1514, FDD 1516 and optical disk drive 1520 can be connected to the system bus 1508 by a HDD interface 1524, an FDD interface 1526 and an optical drive interface 1528, respectively. The HDD interface 1524 for external drive implementations can include at least one or both of Universal Serial Bus (USB) and IEEE 1394 interface technologies. The computing system 1502 is generally is configured to implement all logic, systems, methods, apparatuses, and functionality described herein with reference to FIGS. 1-14.

The drives and associated computer-readable media provide volatile and/or nonvolatile storage of data, data structures, computer-executable instructions, and so forth. For example, a number of program modules can be stored in the drives and memory units 1510, 1512, including an operating system 1530, one or more application programs 1532, other program modules 1534, and program data 1536. In one embodiment, the one or more application programs 1532, other program modules 1534, and program data 1536 can include, for example, the various applications and/or components of the bandwidth estimation system 100, e.g., the bandwidth estimation program 110.

A user can enter commands and information into the computing system 1502 through one or more wire/wireless input devices, for example, a keyboard 1538 and a pointing device, such as a mouse 1540. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 1504 through an input device interface 1542 that is coupled to the system bus 1508, but can be connected by other interfaces such as a parallel port, IEEE 1394 serial port, a game port, a USB port, an IR interface, and so forth.

A monitor 1544 or other type of display device is also connected to the system bus 1508 via an interface, such as a video adaptor 1546. The monitor 1544 may be internal or external to the computing system 1502. In addition to the monitor 1544, a computer typically includes other peripheral output devices, such as speakers, printers, and so forth.

The computing system 1502 may operate in a networked environment using logical connections via wire and/or wireless communications to one or more remote computers, such as a remote computer 1548. The remote computer 1548 can be a workstation, a server computer, a router, a personal computer, portable computer, microprocessor-based entertainment appliance, a peer device or other common network node, and typically includes many or all of the elements described relative to the computing system 1502, although, for purposes of brevity, only a memory/storage device 1550 is illustrated. The logical connections depicted include wire/wireless connectivity to a local area network (LAN) 1552 and/or larger networks, for example, a wide area network (WAN) 1554. Such LAN and WAN networking environments are commonplace in offices and companies, and facilitate enterprise-wide computer networks, such as intranets, all of which may connect to a global communications network, for example, the Internet.

When used in a LAN networking environment, the computing system 1502 is connected to the LAN 1552 through a wire and/or wireless communication network interface or adaptor 1556. The adaptor 1556 can facilitate wire and/or wireless communications to the LAN 1552, which may also include a wireless access point disposed thereon for communicating with the wireless functionality of the adaptor 1556.

When used in a WAN networking environment, the computing system 1502 can include a modem 1558, or is connected to a communications server on the WAN 1554, or has other means for establishing communications over the WAN 1554, such as by way of the Internet. The modem 1558, which can be internal or external and a wire and/or wireless device, connects to the system bus 1508 via the input device interface 1542. In a networked environment, program modules depicted relative to the computing system 1502, or portions thereof, can be stored in the remote memory/storage device 1550. It will be appreciated that the network connections shown are exemplary and other means of establishing a communications link between the computers can be used.

The computing system 1502 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

In summary, the bandwidth estimation method may be implemented in a first example by an apparatus comprising a processor comprising a plurality of cores, the plurality of cores comprising a first core and remaining cores, memory coupled to the processor by a bus, the memory comprising instructions on the first core that, when executed by the processor, cause the processor to inject, via the plurality of cores, a predetermined amount of traffic onto the bus, determine a dependency between latency and bandwidth of the bus based on the predetermined amount of traffic, execute, via the remaining cores, one or more workloads, generate, by the first core, a plurality of memory accesses via the bus, and calculate the bandwidth of the bus consumed by the one or more workloads based in part on the plurality of memory accesses and the dependency.

Further to the first example or any other example discussed herein, in a second example, the apparatus further comprises instructions which, when executed by the processor, cause the processor to read an effective latency of the bus, generate a graph plotting a curve of bandwidth versus latency of the bus, generate an inverse of the graph, the inverse of the graph plotting a second curve of latency versus bandwidth of the bus, and express the second curve in mathematical form.

Further to the first example or any other example discussed herein, in a third example, the apparatus further comprises instructions which, when executed by the processor, cause the processor to traverse a linked list to generate the plurality of memory accesses.

Further to the third example or any other example discussed herein, in a fourth example, the linked list is a circular linked list.

Further to the third example or any other example discussed herein, in a fifth example, the linked list is an array of absolute indexes representing a next element to be visited in the traversal.

Further to the third example or any other example discussed herein, in a sixth example, the linked list is an array of relative indexes representing a next element to be visited in the traversal.

Further to the first example or any other example discussed herein, in a seventh example, the apparatus further comprises instructions which, when executed by the processor, cause the processor to determine a cache size of a cache coupled to the processor, and calculate a linked list size based on the cache size.

Further to the third example or any other example discussed herein, in an eighth example, the plurality of memory accesses is temporally sequential and spatially random.

Further, the bandwidth estimation method may be implemented in a ninth example by a method comprising injecting, via a plurality of cores, a predetermined amount of traffic onto a memory bus, the memory bus to couple a memory to the processor, the plurality of cores comprising a first core and remaining cores, determining a dependency between latency and bandwidth of the memory bus based on the predetermined amount of traffic, executing, via the remaining cores, one or more workloads, generating, by the first core, a plurality of accesses to the memory via the memory bus, and calculating the bandwidth of the memory bus consumed by the one or more workloads based in part on the plurality of memory accesses and the dependency.

Further to the ninth example or any other example discussed herein, in a tenth example, the method further comprises reading an effective latency of the memory bus, generating a graph plotting a curve of bandwidth versus latency of the memory bus, generating an inverse of the graph, the inverse of the graph plotting a second curve of latency versus bandwidth of the memory bus, and expressing the second curve in mathematical form.

Further to the ninth example or any other example discussed herein, in an eleventh example, the method further comprises traversing a linked list to generate the plurality of memory accesses, wherein the memory accesses are temporally sequential and spatially random.

Further to the eleventh example or any other example discussed herein, in a twelfth example, the linked list is selected from a group consisting of a circular linked list, an array of absolute indexes, and an array of relative indexes.

Further to the ninth example or any other example discussed herein, in a thirteenth example, the method further comprises determining a cache size of a cache coupled to the processor, and calculating a linked list size based on the cache size.

The bandwidth estimation method may be implemented in a fourteenth example by at least one non-transitory machine-readable storage medium comprising instructions that, when executed by a processor, cause the processor to inject, via a plurality of cores of the processor, a predetermined amount of traffic onto a bus coupling the processor to a device, the plurality of cores further comprising a first core and remaining cores, determine a dependency between latency and bandwidth of the bus based on the predetermined amount of traffic, execute, via the remaining cores, one or more workloads, generate, by the first core, a plurality of accesses to the device via the bus, and calculate the bandwidth of the bus consumed by the one or more workloads based in part on the plurality of device accesses and the dependency.

Further to the fourteenth example or any other example discussed herein, in a fifteenth example, the at least one machine-readable storage medium further comprises instructions that cause the processor to read an effective latency of the bus, generate a graph plotting a curve of the bandwidth versus latency of the bus, and generate an inverse of the graph, the inverse of the graph plotting a second curve of latency versus bandwidth of the bus.

Further to the fifteenth example or any other example discussed herein, in an sixteenth example, the at least one machine-readable storage medium further comprises instructions that cause the processor to express the second curve in mathematical form.

Further to the sixteenth example or any other example discussed herein, in a seventeenth example, the at least one machine-readable storage medium further comprises instructions that cause the processor to traverse a linked list to generate the plurality of device accesses, wherein the plurality of device accesses are temporally sequential and spatially random.

Further to the seventeenth example or any other example discussed herein, in a eighteenth example, the at least one machine-readable storage medium comprises instructions that further cause the processor to determine a cache size of a cache coupled to the processor and calculate a linked list size based on the cache size.

Further to the fourteenth example or any other example discussed herein, in a nineteenth example, the at least one machine-readable storage medium comprises instructions that further cause the processor to inject the predetermined amount of traffic onto a memory bus coupling the processor to a memory and generate the plurality of accesses to the memory via the memory bus, wherein the calculated bandwidth is of the memory bus.

Further to the fourteenth example or any other example discussed herein, in a twentieth example, the at least one machine-readable storage medium comprises instructions that further cause the processor to inject the predetermined amount of traffic onto an I/O bus coupling the processor to an I/O device and generate the plurality of accesses to the I/O device via the I/O bus, wherein the calculated bandwidth is of the I/O bus.

The bandwidth estimation method may be implemented in a twenty-first example by a method for performing bus bandwidth calculation, the method comprises injecting, via a plurality of cores of the processor, a predetermined amount of traffic onto a bus coupling the processor to a device, the plurality of cores further comprising a first core and remaining cores, determining a dependency between latency and bandwidth of the bus based on the predetermined amount of traffic, executing, via the remaining cores, one or more workloads, generate, by the first core, a plurality of accesses to the device via the bus, and calculating the bandwidth of the bus consumed by the one or more workloads based in part on the plurality of device accesses and the dependency.

Further to the twenty-first example or any other example discussed herein, in a twenty-second example, the method further comprises reading an effective latency of the bus, generating a graph plotting a curve of the bandwidth versus latency of the bus, and generating an inverse of the graph, the inverse of the graph plotting a second curve of latency versus bandwidth of the bus.

Further to the twenty-second example or any other example discussed herein, in a twenty-third example, the method further comprises expressing the second curve in mathematical form.

Further to the twenty-third example or any other example discussed herein, in a twenty-fourth example, the method further comprises traversing a linked list to generate the plurality of device accesses, wherein the plurality of device accesses are temporally sequential and spatially random.

Further to the twenty-fourth example or any other example discussed herein, in a twenty-fifth example, the method further comprises determining a cache size of a cache coupled to the processor and calculating a linked list size based on the cache size.

The bandwidth estimation method may be implemented in a twenty-sixth example by a machine-readable storage including machine-readable instructions which, when executed, implement a method or realize an apparatus as claimed in any claim recited herein.

The bandwidth estimation method may be implemented in a twenty-seventh example by an apparatus comprising means to perform a method as claimed in any claim recited herein.

Some embodiments may be described using the expression "one embodiment" or "an embodiment" along with their derivatives. These terms mean that a feature, structure, or characteristic described relating to the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, various features are grouped together in a single embodiment for streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the Plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided herein are not intended to be limiting.

The invention claimed is:

1. An apparatus comprising:
a processor comprising a plurality of cores, the plurality of cores comprising a first core and remaining cores;
memory coupled to the processor by a bus, the memory comprising instructions executable by the processor which, when executed, cause the processor to:
inject, via the plurality of cores, a predetermined amount of traffic onto the bus;
determine a dependency between latency and bandwidth of the bus based on the predetermined amount of traffic;
generate a function that, given a latency, will return an associated bandwidth based on the dependency;
execute, via the remaining cores, one or more workloads;
generate, by the first core, a plurality of memory accesses via the bus; and
calculate the bandwidth of the bus consumed by the one or more workloads based in part on the plurality of memory accesses and the function.

2. The apparatus of claim 1, further comprising instructions which, when executed by the processor, cause the processor to:
read an effective latency of the bus;
generate a graph plotting a curve of bandwidth versus latency of the bus;
generate an inverse of the graph, the inverse of the graph plotting a second curve of latency versus bandwidth of the bus; and
express the second curve in mathematical form.

3. The apparatus of claim 1, further comprising instructions which, when executed by the processor, cause the processor to traverse a linked list to generate the plurality of memory accesses.

4. The apparatus of claim 3, wherein the linked list is a circular linked list.

5. The apparatus of claim 3, wherein the linked list is an array of absolute indexes representing a next element to be visited in the traversal.

6. The apparatus of claim 3, wherein the linked list is an array of relative indexes representing a next element to be visited in the traversal.

7. The apparatus of claim 1, further comprising instructions which, when executed by the processor, cause the processor to:
determine a cache size of a cache coupled to the processor; and
calculate a linked list size based on the cache size.

8. The apparatus of claim 3, wherein the plurality of memory accesses is temporally sequential and spatially random.

9. A method comprising:
injecting, via a plurality of cores of a processor, a predetermined amount of traffic onto a memory bus, the memory bus to couple a memory to the processor, the plurality of cores comprising a first core and remaining cores;
determining a dependency between latency and bandwidth of the memory bus based on the predetermined amount of traffic;
generating a function that, given a latency, will return an associated bandwidth based on the dependency;
executing, via the remaining cores, one or more workloads;
generating, by the first core, a plurality of accesses to the memory via the memory bus; and
calculating the bandwidth of the memory bus consumed by the one or more workloads based in part on the plurality of accesses to the memory and the function.

10. The method of claim 9, further comprising:
reading an effective latency of the memory bus;
generating a graph plotting a curve of bandwidth versus latency of the memory bus;
generating an inverse of the graph, the inverse of the graph plotting a second curve of latency versus bandwidth of the memory bus; and
expressing the second curve in mathematical form.

11. The method of claim 9, further comprising traversing a linked list to generate the plurality of memory accesses, wherein the memory accesses are temporally sequential and spatially random.

12. The method of claim 11, wherein the linked list is a circular linked list, an array of absolute indexes, or an array of relative indexes.

13. The method of claim 9, further comprising:
determining a cache size of a cache coupled to the processor; and
calculating a linked list size based on the cache size.

14. At least one non-transitory machine-readable storage medium comprising instructions that, when executed by a processor, cause the processor to:
inject, via a plurality of cores of the processor, a predetermined amount of traffic onto a bus coupling the processor to a device, the plurality of cores further comprising a first core and remaining cores;
determine a dependency between latency and bandwidth of the bus based on the predetermined amount of traffic;
generate a function that, given a latency, will return an associated bandwidth based on the dependency;
execute, via the remaining cores, one or more workloads;
generate, by the first core, a plurality of accesses to the device via the bus; and
calculate the bandwidth of the bus consumed by the one or more workloads based in part on the plurality of accesses to the device and the function.

15. The at least one non-transitory machine-readable storage medium of claim 14, further comprising instructions that cause the processor to:
read an effective latency of the bus;
generate a graph plotting a curve of the bandwidth versus latency of the bus; and
generate an inverse of the graph, the inverse of the graph plotting a second curve of latency versus bandwidth of the bus.

16. The at least one non-transitory machine-readable storage medium of claim 15, further comprising instructions that cause the processor to express the second curve in mathematical form.

17. The at least one non-transitory machine-readable storage medium of claim 16, further comprising instructions that cause the processor to traverse a linked list to generate the plurality of accesses to the device, wherein the plurality of accesses to the device is temporally sequential and spatially random.

18. The at least one non-transitory machine-readable storage medium of claim 17, further comprising instructions that cause the processor to:
determine a cache size of a cache coupled to the processor; and
calculate a linked list size based on the cache size.

19. The at least one non-transitory machine-readable storage medium of claim 14, further comprising instructions that cause the processor to:
- inject the predetermined amount of traffic onto a memory bus coupling the processor to a memory; and
- generate the plurality of accesses to the memory via the memory bus;
- wherein the calculated bandwidth is of the memory bus.

20. The at least one non-transitory machine-readable storage medium of claim 14, further comprising instructions that cause the processor to:
- inject the predetermined amount of traffic onto an input/output (I/O) bus coupling the processor to an I/O device; and
- generate the plurality of accesses to the I/O device via the I/O bus;
- wherein the calculated bandwidth is of the I/O bus.

* * * * *